(12) United States Patent
Nakai et al.

(10) Patent No.: US 11,833,609 B2
(45) Date of Patent: Dec. 5, 2023

(54) ATTACHING AND DETACHING APPARATUS, MACHINING DEVICE, AND MACHINING HEAD

(71) Applicant: Mitsubishi Electric Corporation, Tokyo (JP)

(72) Inventors: Hidekazu Nakai, Tokyo (JP); Masahiko Hasegawa, Tokyo (JP); Akinori Nishio, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 173 days.

(21) Appl. No.: 17/435,035

(22) PCT Filed: Dec. 4, 2019

(86) PCT No.: PCT/JP2019/047419
§ 371 (c)(1),
(2) Date: Aug. 31, 2021

(87) PCT Pub. No.: WO2020/179162
PCT Pub. Date: Sep. 10, 2020

(65) Prior Publication Data
US 2022/0161358 A1    May 26, 2022

(30) Foreign Application Priority Data
Mar. 6, 2019    (JP) .................... 2019-040714

(51) Int. Cl.
*B23K 26/06*     (2014.01)
*B23K 26/38*     (2014.01)

(52) U.S. Cl.
CPC .......... *B23K 26/0665* (2013.01); *B23K 26/38* (2013.01)

(58) Field of Classification Search
CPC ......................... B23K 26/0665; B23K 26/38
(Continued)

(56) References Cited

U.S. PATENT DOCUMENTS

| 1,852,599 A | * | 4/1932 | Zaiger | ...................... H05B 3/84 |
| | | | | 219/203 |
| 2,002,722 A | * | 5/1935 | Thorp | ...................... H05B 3/84 |
| | | | | 219/532 |

(Continued)

FOREIGN PATENT DOCUMENTS

| JP | 4-104271 U | 9/1992 |
| JP | 2008-259292 A | 10/2008 |

(Continued)

OTHER PUBLICATIONS

International Search Report and Written Opinion dated Feb. 4, 2020, received for PCT Application PCT/JP2019/047419, Filed on Dec. 4, 2019, 11 pages including English Translation.

(Continued)

*Primary Examiner* — Jimmy Chou
(74) *Attorney, Agent, or Firm* — XSENSUS LLP

(57) ABSTRACT

An attaching and detaching apparatus includes a main mounting plate to which a main mounting object is to be mounted, an attachment mounting plate to which an attachment mounting object is to be mounted, and a connecting member between the main mounting plate and the attachment mounting plate. A protrusion projecting toward the connecting member is formed on the main mounting plate. A hole into which the protrusion fits is formed on the connecting member. A first contact surface in the shape of a surface of revolution is formed on the protrusion. A second contact surface in the shape of a surface of revolution is formed on the inner surface of the hole. The first contact surface and the second contact surface are in contact with each other with the central axis of the protrusion coinciding with the central axis of the hole.

20 Claims, 20 Drawing Sheets

(58) Field of Classification Search
USPC .................................................. 219/121.73
See application file for complete search history.

(56) References Cited

U.S. PATENT DOCUMENTS

| | | | | |
|---|---|---|---|---|
| 2,172,461 A * | 9/1939 | Whitescarver | ...... | E04G 17/0658 269/49 |
| 3,634,649 A * | 1/1972 | Rager | ................. | B23K 9/0026 219/137 R |
| 4,492,355 A * | 1/1985 | Bylin | .................... | B65G 69/20 211/DIG. 1 |
| 4,517,070 A * | 5/1985 | Kisner | ................ | H01J 37/3497 204/192.12 |
| 4,585,197 A * | 4/1986 | Liautaud | ................ | F16M 11/14 403/89 |
| 4,595,186 A * | 6/1986 | Reed | .................. | B23K 37/0461 269/69 |
| 4,615,514 A * | 10/1986 | Hamlin | ................ | B23K 37/053 269/49 |
| 4,627,565 A * | 12/1986 | Lomerson | ............ | H05K 3/4084 29/853 |
| 4,717,131 A * | 1/1988 | Dugas | ....................... | B25B 5/10 267/41 |
| 4,807,947 A * | 2/1989 | Nuzzo | ....................... | G09F 7/20 248/295.11 |
| 4,824,231 A * | 4/1989 | Quintana | ................ | B60R 1/081 248/479 |
| 4,831,240 A * | 5/1989 | Davis | ..................... | H01R 4/06 219/541 |
| 4,851,640 A * | 7/1989 | Smith | ..................... | F02N 19/10 392/455 |
| 4,883,570 A * | 11/1989 | Efthimion | .............. | B01D 53/34 204/170 |
| 5,067,696 A * | 11/1991 | Morley | ..................... | B25B 5/10 269/49 |
| 5,247,157 A * | 9/1993 | Spendlove | ........... | H05B 3/0004 219/535 |
| 5,822,918 A * | 10/1998 | Helfman | ................ | A47G 7/044 248/231.41 |
| 5,839,647 A * | 11/1998 | Orne | .................... | B23K 37/053 269/49 |
| 6,103,183 A * | 8/2000 | Brown | ................... | B23K 7/102 266/77 |
| 6,113,072 A * | 9/2000 | Wickett | ............. | F01M 11/0408 251/351 |
| 6,382,496 B1 * | 5/2002 | Harger | ................... | B23K 23/00 228/234.3 |
| 6,988,701 B1 * | 1/2006 | Lin | ......................... | G09F 17/00 248/521 |
| 7,066,125 B2 * | 6/2006 | Lieberman | ............... | F01P 11/20 123/142.5 R |
| 7,674,072 B2 * | 3/2010 | Shook | ..................... | F16L 41/04 285/21.2 |
| 7,717,376 B2 * | 5/2010 | Sparks, Jr. | .............. | F16B 12/30 248/300 |
| 7,870,768 B2 * | 1/2011 | Tanioka | ............ | B60R 25/02153 70/252 |
| 8,308,123 B1 * | 11/2012 | Accordino | ............ | A45C 13/40 248/220.21 |
| 9,869,529 B2 * | 1/2018 | Gomez | .................... | F41G 1/545 |
| 2007/0102607 A1 * | 5/2007 | Koh | .................... | F16M 11/2064 248/276.1 |
| 2008/0251651 A1 * | 10/2008 | Jackson | ................ | F16L 3/1016 248/62 |
| 2011/0226747 A1 * | 9/2011 | Furuta | ................. | H01L 21/6715 219/121.72 |
| 2012/0138760 A1 * | 6/2012 | Gephart | .................... | F16B 2/12 248/226.11 |
| 2012/0318934 A1 * | 12/2012 | Thomas | .................. | F16L 3/133 248/58 |
| 2013/0037666 A1 * | 2/2013 | Simmons | ........... | B01D 46/0004 248/220.31 |
| 2013/0119213 A1 * | 5/2013 | Watson | ..................... | E06C 7/42 248/201 |
| 2014/0103016 A1 * | 4/2014 | Ward | ..................... | B23K 10/00 219/121.44 |
| 2015/0174689 A1 * | 6/2015 | Murakami | ............. | B23K 11/36 219/91.2 |

FOREIGN PATENT DOCUMENTS

| | | |
|---|---|---|
| JP | 2012-110907 A | 6/2012 |
| JP | 2012-139691 A | 7/2012 |

OTHER PUBLICATIONS

Office Action dated Jun. 20,2023, in corresponding Japanese patent Application No. 2022-178709, 6 pages.

* cited by examiner

ATTACHING AND DETACHING APPARATUS, MACHINING DEVICE, AND MACHINING HEAD

CROSS-REFERENCE TO RELATED APPLICATIONS

The present application is based on PCT filing PCT/JP2019/047419, filed Dec. 4, 2019, which claims priority to JP 2019-040714, filed Mar. 6, 2019, the entire contents of each are incorporated herein by reference.

FIELD

The present invention relates to an attaching and detaching apparatus including attracting means, a processing machine including the attaching and detaching apparatus, and a machining head.

BACKGROUND

A known machining device includes a machining head and a moving means for moving the machining head in two or three dimensions, and moves the machining head with the moving means relative to a workpiece in a preset path to machine the workpiece. For this machining device, a substance is sent out from the machining head, and collides with a workpiece, thereby machining the workpiece. Such machining devices include a laser machining device equipped with a laser machining head, a plasma machining device equipped with a plasma machining head, a water jet machining device equipped with a water jet machining head, a gas cutting machine equipped with a gas machining head, and a milling machine equipped with an abrasive spray head. If a workpiece is warped, the machining head of such a machining device can collide with the warped portion of the workpiece, and the machining head can be damaged by an impact force during the collision. An operating error on an operator's part or a failure of the processing machine can cause the machining head to collide with an obstacle such as a workpiece and be damaged.

In view of this, an attaching and detaching apparatus having an attaching and detaching function has been developed as an apparatus for reducing an impact force applied to the machining head during a collision. For example, Patent Literature 1 discloses an attaching and detaching apparatus including a plate fixed to a moving means and a holder connected to the plate. A machining head is fixed to the holder. Either a connecting surface of the plate connected to the holder or a connecting surface of the holder connected to the plate is provided with magnets for attracting the other connecting surface. A plurality of spheres are formed on one of the connecting surface of the plate and the connecting surface of the holder, and project toward the other. A plurality of recessed surfaces into which the spheres fit are formed on the other connecting surface.

If the machining head collides with an obstacle, and an impact force exceeding the attracting force of the magnets is applied to the machining head, this attaching and detaching apparatus allows the machining head to be separated from the plate or move along the direction of action of the impact force. Consequently, an excessive impact force is not applied to the machining head, and the machining head is prevented from being damaged.

CITATION LIST

Patent Literature

Patent Literature 1: Japanese Unexamined Utility Model Application Publication 04-104271

SUMMARY

Technical Problem

For the conventional attaching and detaching apparatus, unfortunately, misalignment occurs between the plate and the holder because misalignment occurs between the spheres and the recessed surfaces due to manufacturing errors, resulting in partial contacts between the spheres and the recessed surfaces.

In the conventional attaching and detaching apparatus, the positions of contact between the spheres and the recessed surfaces are not uniquely determined due to the partial contacts between the spheres and the recessed surfaces. When the plate and the holder are separated from and subsequently reconnected to each other, the positional relationship between the plate and the holder before the separation differs from that after the reconnection.

The present invention has been made in view of the above. It is an object of the present invention to provide an attaching and detaching apparatus having high positioning accuracy at the time a first mounting plate and a second mounting plate are connected to each other.

Solution to Problem

In order to solve the above-described problems and achieve the object, an attaching and detaching apparatus according to the present invention comprises: a first mounting plate to which a first mounting object is to be mounted; a second mounting plate to which a second mounting object is to be mounted, the second mounting plate being disposed at a distance from the first mounting plate; an attracting means to separably connect the first mounting plate and the second mounting plate to each other; and a connecting member disposed between the first mounting plate and the second mounting plate, the connecting member being formed separately from the first mounting plate and the second mounting plate. The connecting member is fixed to the first mounting plate. At least one protrusion is formed on one of the connecting member and the second mounting plate, the protrusion projecting toward the other. At least one hole into which the protrusion fits is formed on the other of the connecting member and the second mounting plate. A first contact surface in a shape of a surface of revolution is formed on the protrusion. A second contact surface in a shape of a surface of revolution is formed on an inner surface of the hole. The first contact surface and the second contact surface are in contact with each other with a central axis of the protrusion coinciding with a central axis of the hole.

Advantageous Effects of Invention

The present invention achieves the effect of improving positioning accuracy at the time of the first mounting plate and the second mounting plate are connected to each other.

DESCRIPTION OF EMBODIMENTS

Hereinafter, an attaching and detaching apparatus, a processing machine, and a machining head according to embodiments of the present invention will be described in detail with reference to the drawings. Note that the embodiments are not intended to limit the invention.

First Embodiment

Figure 1:
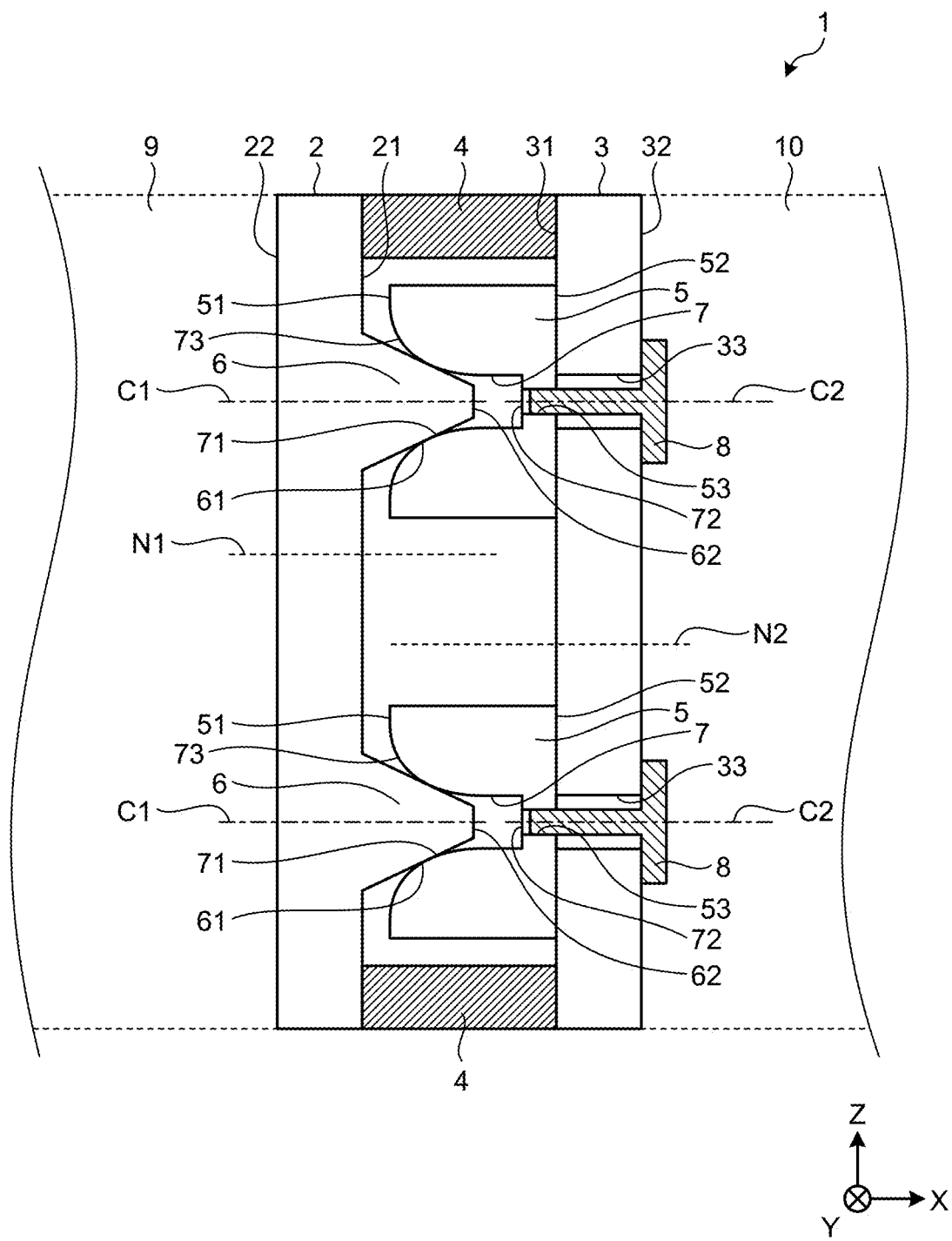
FIG. 1 is a diagram for explaining an attaching and detaching apparatus according to a first embodiment of the present invention.
Figure 2:
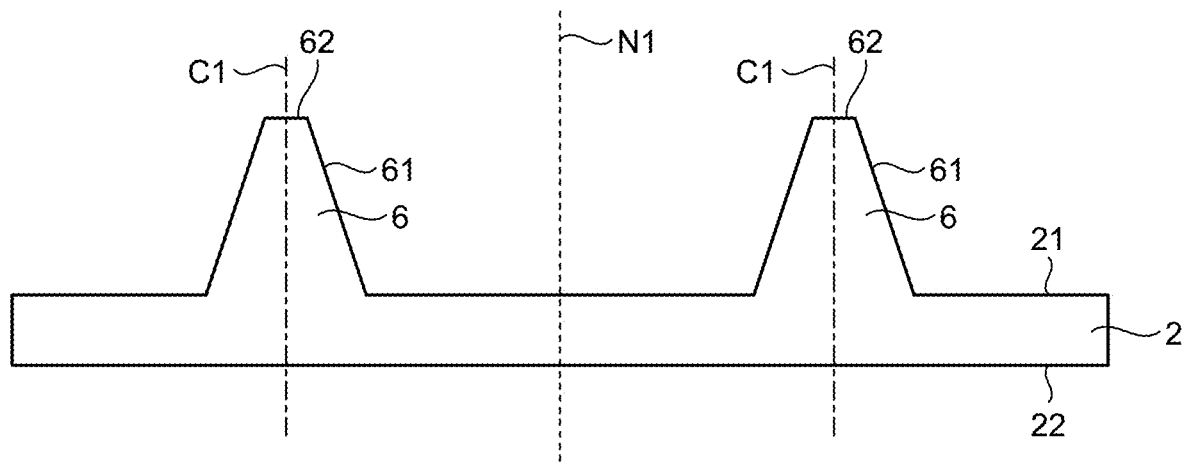
FIG. 2 is a diagram illustrating a main mounting plate according to the first embodiment.
Figure 3:
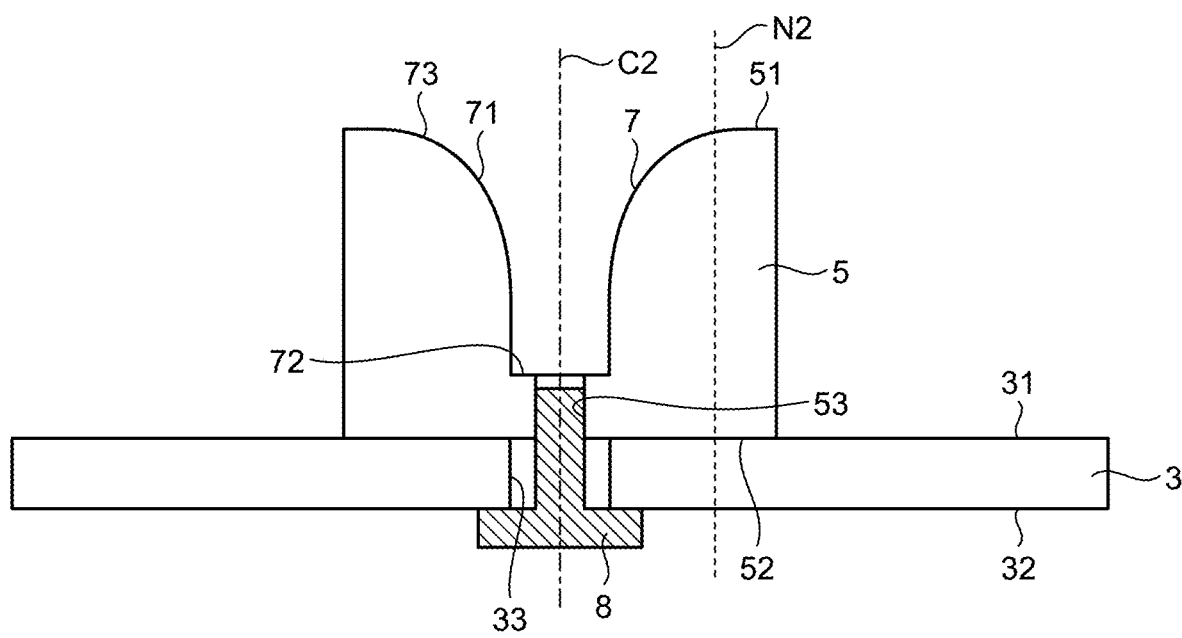
FIG. 3 is a diagram illustrating an attachment mounting plate and a connecting member according to the first embodiment.

FIG. 1 is a diagram for explaining an attaching and detaching apparatus 1 according to a first embodiment of the present invention. FIG. 2 is a diagram illustrating a main mounting plate 2 according to the first embodiment. FIG. 3 is a diagram illustrating an attachment mounting plate 3 and a connecting member 5 according to the first embodiment. The attaching and detaching apparatus 1 includes the main mounting plate 2, the attachment mounting plate 3, attracting means 4, and the connecting members 5. In the following description, the right-and-left direction in FIG. 1 is defined as the X-axis direction, the up-and-down direction in FIG. 1 as the Z-axis direction, and the direction orthogonal to the X-axis direction and the Z-axis direction as the Y-axis direction. XYZ-axis coordinates illustrated in the drawings other than FIG. 1 correspond to an XYZ-axis coordinate system illustrated in FIG. 1. The term "orthogonal" in the description of the present application means not only a state of being completely orthogonal but also a state of being slightly oblique rather than exactly orthogonal.

The main mounting plate 2 is a plate-shaped member to which a main mounting object 9 is to be mounted. The main mounting object 9 is, for example, a moving means for moving an attachment mounting object 10 in two or three dimensions. The material of the main mounting plate 2, which is not limited to a particular one as long as the main mounting plate 2 can be attracted to the attracting means 4, is, for example, iron, stainless steel, silicon steel, aluminum, or a carbon fiber reinforced plastic (CFRP). The main mounting plate 2 has a main connecting surface 21 facing the attachment mounting plate 3 and a main mounting surface 22 facing the side opposite to the main connecting surface 21. In the present embodiment, the main mounting plate 2 to which the connecting members 5 are not fixed is a second mounting plate, and the main mounting object 9 is a second mounting object. In the present embodiment, the main connecting surface 21 is a second connecting surface, and the main mounting surface 22 is a second mounting surface.

The main connecting surface 21 is a plane, or a flat surface orthogonal to the X-axis direction. A plurality of protrusions 6 projecting toward the attachment mounting plate 3 are formed on the main connecting surface 21. The plurality of protrusions 6 are spaced from each other. In the present embodiment, the shape of the protrusion 6 is a truncated cone shape whose diameter decreases toward the attachment mounting plate 3. The protrusion 6 has a first contact surface 61 and a first top surface 62. The first contact surface 61 is formed in a conical surface shape whose diameter decreases toward the attachment mounting plate 3. The first contact surface 61 is formed in the shape of a surface of revolution having a central axis C1. The first contact surface 61 is formed in a shape symmetric about the central axis C1. The central axis C1 is parallel to the normal direction N1 of the main connecting surface 21 of the main mounting plate 2. That is, the central axis C1 is orthogonal to the main connecting surface 21 of the main mounting plate 2. The first top surface 62 is continuous with the distal end of the first contact surface 61. The first top surface 62 is a plane orthogonal to the X-axis direction.

The main mounting surface 22 is a plane orthogonal to the X-axis direction. The main mounting object 9 is fixed to the main mounting surface 22.

The attachment mounting plate 3 is a plate-shaped member to which the attachment mounting object 10 is to be mounted. The attachment mounting object 10 is, for example, a laser machining head of a laser machining device, a plasma machining head of a plasma machining device, a water jet machining head of a water jet machining device, a gas machining head of a gas cutting machine, or an abrasive spray head of a milling machine. The attachment mounting plate 3 is disposed at a distance from the main mounting plate 2 in the X-axis direction. The material of the attachment mounting plate 3, which is not limited to a particular one as long as the attachment mounting plate 3 can be attracted to the attracting means 4, is, for example, iron, stainless steel, silicon steel, aluminum, or a CFRP. The attachment mounting plate 3 has an attachment connecting surface 31 facing the main mounting plate 2 and an attachment mounting surface 32 facing the side opposite to the attachment connecting surface 31. In the present embodiment, the attachment mounting plate 3 to which the connecting members 5 are fixed is a first mounting plate, and the attachment mounting object 10 is a first mounting object. In the present embodiment, the attachment connecting surface 31 is a first connecting surface, and the attachment mounting surface 32 is a first mounting surface.

The attachment connecting surface 31 is a plane orthogonal to the X-axis direction. The connecting members 5 are fixed to the attachment connecting surface 31.

The attachment mounting surface 32 is a plane orthogonal to the X-axis direction. The attachment mounting object 10 is fixed to the attachment mounting surface 32. Through holes 33 for allowing bolts 8 to pass therethrough are formed in the attachment mounting plate 3. The through holes 33 extend from the attachment mounting surface 32 to the attachment connecting surface 31. The inner diameter of the through holes 33 is larger than the shaft diameter of the bolts 8.

The attracting means 4 are means for separably connecting the main mounting plate 2 and the attachment mounting plate 3 to each other. The attracting means 4, which are not limited to particular ones as long as the attracting means 4 have attracting force to separably connect the main mounting plate 2 and the attachment mounting plate 3 to each other, are, for example, magnets. The attracting means 4 are disposed in close contact with the main connecting surface 21 and the attachment connecting surface 31. In the present embodiment, the attracting means 4 are fixed to the attachment connecting surface 31 of the attachment mounting plate 3, but may be fixed to the main connecting surface 21 of the main mounting plate 2. If an impact force exceeding the attracting force of the attracting means 4 is applied to the attachment mounting plate 3, the main mounting plate 2 and the attracting means 4 are separated from each other. This can prevent damage to the attachment mounting object 10 such as a machining head mounted to the attachment mounting plate 3.

The connecting members 5 are members that connect the main mounting plate 2 and the attachment mounting plate 3 to each other. The material of the connecting members 5, which is not limited to a particular one, is, for example, stainless steel, aluminum, or resin. The connecting members 5 have a facing surface 51 facing the main mounting plate 2 and an abutment surface 52 facing the attachment mounting plate 3.

A hole 7 into which the protrusion 6 fits is formed on the facing surface 51. A second contact surface 71 and a bottom surface 72 are formed on the inner surface of the hole 7. The bottom surface 72 is a plane orthogonal to the X-axis direction. The second contact surface 71 is formed on a trumpet-shaped surface whose diameter increases from the bottom surface 72 toward an opening 73. The bottom surface 72 is the bottom of the hole 7. The second contact surface 71 is formed in the shape of a surface of revolution having a central axis C2. The second contact surface 71 is formed in a shape symmetric about the central axis C2. The central axis C2 is orthogonal to the abutment surface 52 that is a plane abutting on the attachment connecting surface 31. The abutment surface 52 is parallel to the attachment connecting surface 31. Thus, the central axis C2 is parallel to the normal direction N2 of the attachment connecting surface 31 of the attachment mounting plate 3. That is, the central axis C2 is orthogonal to the attachment connecting surface 31 of the attachment mounting plate 3. In the present embodiment, the entire surface of the abutment surface 52 is a plane, but a part of the abutment surface 52 may be a plane.

A bolt hole 53 for fixing the bolt 8 is formed in each connecting member 5. The bolt hole 53 extends from the abutment surface 52 to the bottom surface 72. In the present embodiment. The bolt 8 passing through the through hole 33 of the attachment mounting plate 3 is screwed into the bolt hole 53 to thereby fix each of the connecting members 5 to the attachment mounting plate 3. The inner diameter of the through hole 33 is larger than the shaft diameter of the bolt 8, such that, when the bolt 8 is loosened, the connecting member 5 can be freely moved in the in-plane direction of, or a direction parallel to the attachment connecting surface 31 of the attachment mounting plate 3.

The protrusions 6 and the holes 7 are formed such that the first contact surface 61 and the second contact surface 71 two-dimensionally or three-dimensionally contact each other when the protrusions 6 and the holes 7 fit together with the central axes C1 and C2 coinciding with each other. In other words, the diameters, curvatures, etc. of the first contact surface 61 and the second contact surface 71 are set such that the first contact surface 61 and the second contact surface 71 two-dimensionally or three-dimensionally contact each other with the central axes C1 and C2 coinciding with each other. The central axis C1 is orthogonal to the main connecting surface 21 of the main mounting plate 2, and the central axis C2 is orthogonal to the attachment connecting surface 31 of the attachment mounting plate 3. The main connecting surface 21 of the main mounting plate 2 and the attachment connecting surface 31 of the attachment mounting plate 3 is thus exactly parallel to each other. When the attaching and detaching apparatus 1 that allows a pair of mounting plates to be accurately parallel without surface tilting is used in, for example, a laser machining device, an actual path of laser light passing through the attaching and detaching apparatus 1 coincides with a design optical path, so that the beam quality is not reduced. Thus, a laser machining device capable of higher-quality machining than before can be provided.

Figure 4:
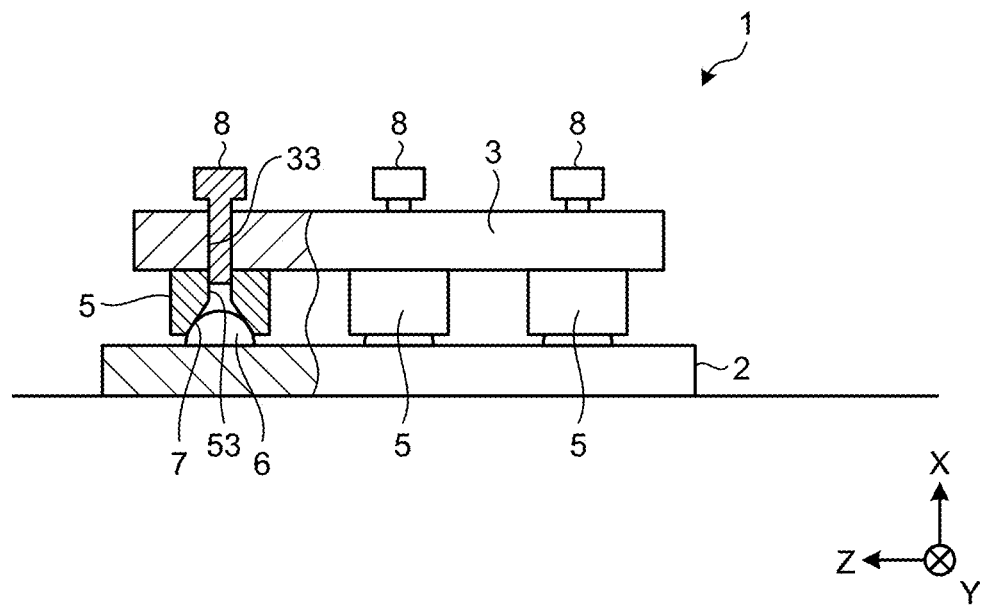
FIG. 4 is a diagram for explaining a method of assembling the attaching and detaching apparatus according to the first embodiment, the diagram illustrating a step of temporarily fixing connecting members to the attachment mounting plate.
Figure 5:
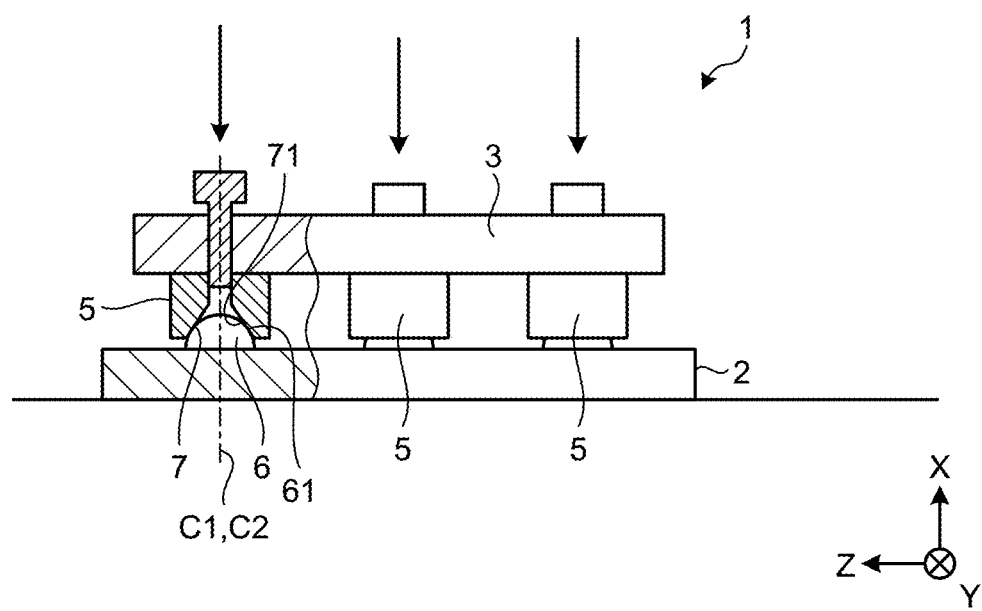
FIG. 5 is a diagram for explaining the method of assembling the attaching and detaching apparatus according to the first embodiment, the diagram illustrating a step of adjusting the positions of protrusions and holes by applying an external force to the attachment mounting plate.
Figure 6:
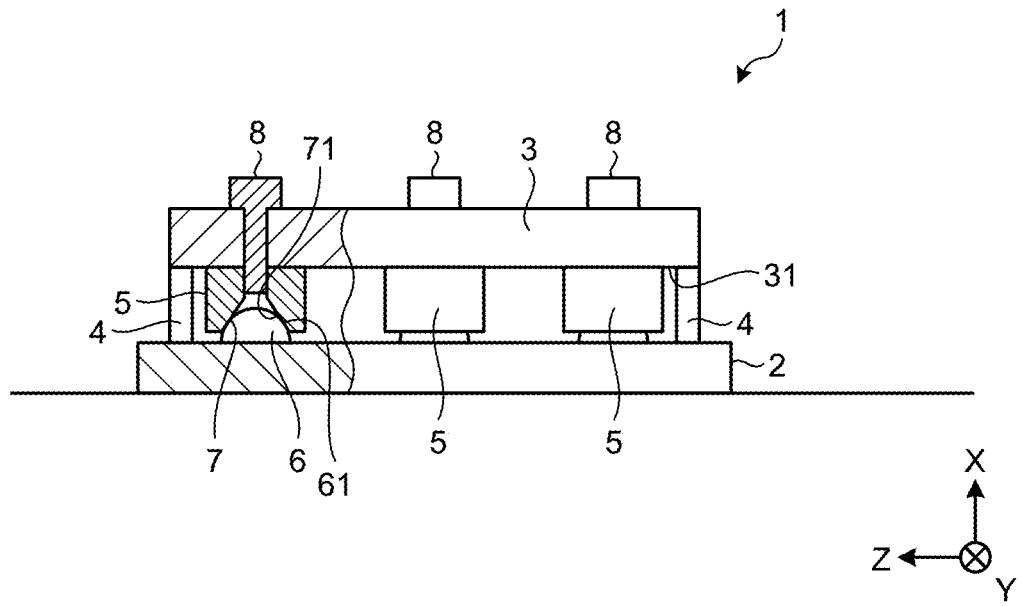
FIG. 6 is a diagram for explaining the method of assembling the attaching and detaching apparatus according to the first embodiment, the diagram illustrating a step of finally fixing the connecting members to the attachment mounting plate.

Next, a method of assembling the attaching and detaching apparatus 1 according to the first embodiment will be described. FIG. 4 is a diagram for explaining the method of assembling the attaching and detaching apparatus 1 according to the first embodiment, the diagram illustrating a step of temporarily fixing the connecting members 5 to the attachment mounting plate 3. FIG. 5 is a diagram for explaining the method of assembling the attaching and detaching apparatus 1 according to the first embodiment, the diagram illustrating a step of adjusting the positions of the protrusions 6 and the holes 7 by applying external force to the attachment mounting plate 3. FIG. 6 is a diagram for explaining the method of assembling the attaching and detaching apparatus 1 according to the first embodiment, the diagram illustrating a step of finally fixing the connecting members 5 to the attachment mounting plate 3.

First, as illustrated in FIG. 4, the bolts 8 are inserted into the through holes 33 of the attachment mounting plate 3 and the bolt holes 53 of the connecting members 5 to temporarily fix the connecting members 5 to the attachment mounting plate 3. When in the temporarily fixed state, the bolts 8 remain loosely inserted in the bolt holes 53 of the connecting members 5 to such an extent that the connecting members 5 can move in the in-plane direction of the attachment mounting plate 3. Then, the main mounting plate 2 is placed with the protrusions 6 facing up, the attachment mounting plate 3 is placed with the holes 7 facing down, and the attachment mounting plate 3 is put on the main mounting plate 2. At this time, the attachment mounting plate 3 is placed in a position where the protrusions 6 of the main mounting plate 2 approximately coincide with the holes 7 of the connecting members 5.

Next, as illustrated in FIG. 5, external force is applied to the attachment mounting plate 3, such as application of load to the attachment mounting plate 3 from above or shaking of the attachment mounting plate 3, to thereby move the connecting members 5 in the in-plane direction of the attachment mounting plate 3 such that the positions of the holes 7 are aligned with the positions of the protrusions 6. Consequently, the central axes C1 of the protrusions 6 coincide with the central axes C2 of the holes 7, and the first contact surfaces 61 of the protrusions 6 contact the second contact surfaces 71 of the holes 7.

Next, as illustrated in FIG. 6, the bolts 8 are finally tightened with the first contact surfaces 61 of the protrusions 6 held in contact with the second contact surfaces 71 of the holes 7, to thereby finally fix the connecting members 5 to the attachment mounting plate 3. In this state, the movements of the connecting members 5 are restricted. Then, the attracting means 4 are fixed to the attachment connecting surface 31 of the attachment mounting plate 3, such that the main mounting plate 2 and the attachment mounting plate 3 are fixed under the attracting force of the attracting means 4. The assembly of the attaching and detaching apparatus 1 is completed through the above steps. The attachment mounting plate 3 may be placed with the holes 7 facing up, and the main mounting plate 2 with the protrusions 6 facing down may be put on the attachment mounting plate 3.

Next, the functions and effects of the attaching and detaching apparatus 1 according to the first embodiment will be described.

Figure 7:
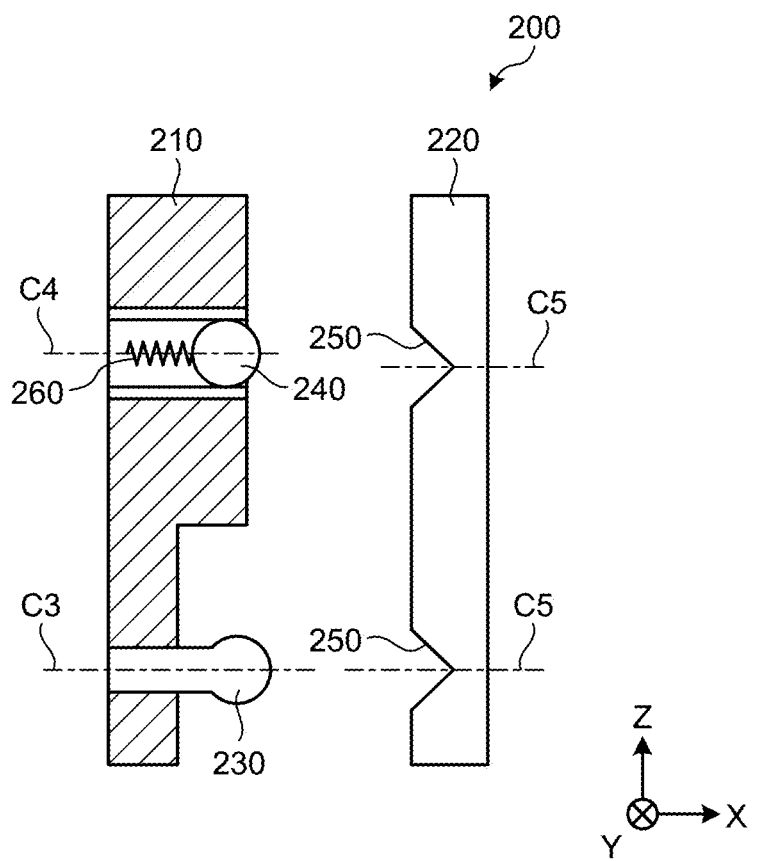
FIG. 7 is a diagram illustrating a conventional attaching and detaching apparatus, the diagram illustrating a plate and a holder that are separated from each other.
Figure 8:
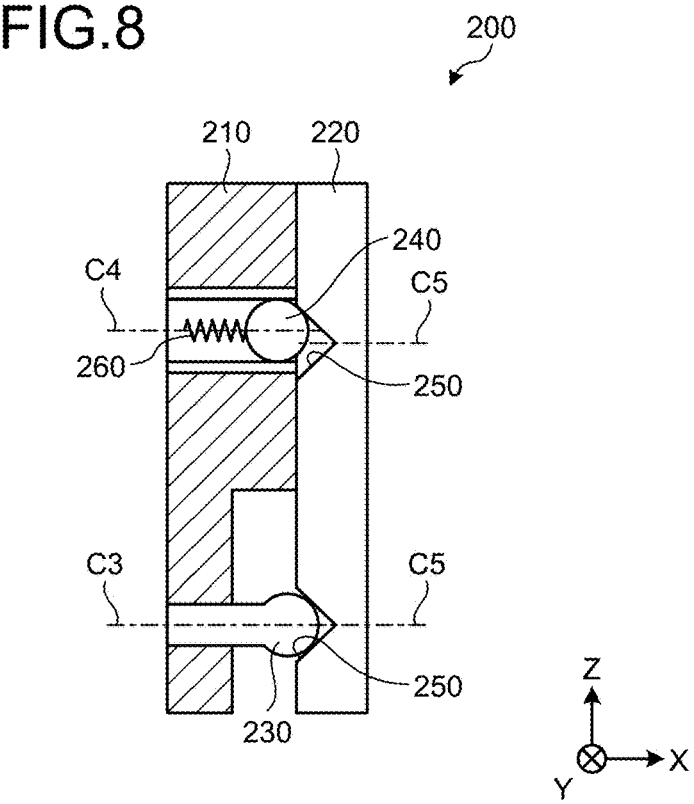
FIG. 8 is a diagram illustrating the conventional attaching and detaching apparatus, the diagram illustrating the plate and the holder that are connected to each other.

FIG. 7 is a diagram illustrating a conventional attaching and detaching apparatus 200, the diagram illustrating a plate 210 and a holder 220 that are separated from each other. FIG. 8 is a diagram illustrating the conventional attaching and detaching apparatus 200, the diagram illustrating the plate 210 and the holder 220 that are connected to each other. The conventional attaching and detaching apparatus 200 includes the plate 210 and the holder 220. The plate 210 and the holder 220 are spaced apart from each other in the X-axis direction. The plate 210 is provided with a positioning pin 230 projecting toward the holder 220. The plate 210 is provided with a sphere 240 urged by a spring 260 toward the holder 220. A plurality of conical recessed surfaces 250 into which the positioning pin 230 and the sphere 240 fit are formed on a surface of the holder 220 facing the plate 210.

In the conventional attaching and detaching apparatus 200, the positional relationship between the sphere 240 and the recessed surface 250 sometimes does not exactly agree with the positional relationship between the positioning pin 230 and the recessed surface 250 due to manufacturing errors. Consequently, as illustrated in FIG. 8, when the central axis C3 of the positioning pin 230 coincides with the central axis C5 of one recessed surface 250, the central axis C4 of the sphere 240 is offset from the central axis C5 of the other recessed surface 250, which results in misalignment between the plate 210 and the holder 220. The conventional attaching and detaching apparatus 200 does not include means for eliminating misalignment between the plate 210 and the holder 220. If this attaching and detaching apparatus 200 is used in, for example, a laser machining device, the path of laser light deviates from an exactly designed optical path, so that the beam quality of the laser machining device deteriorates.

Figure 9:
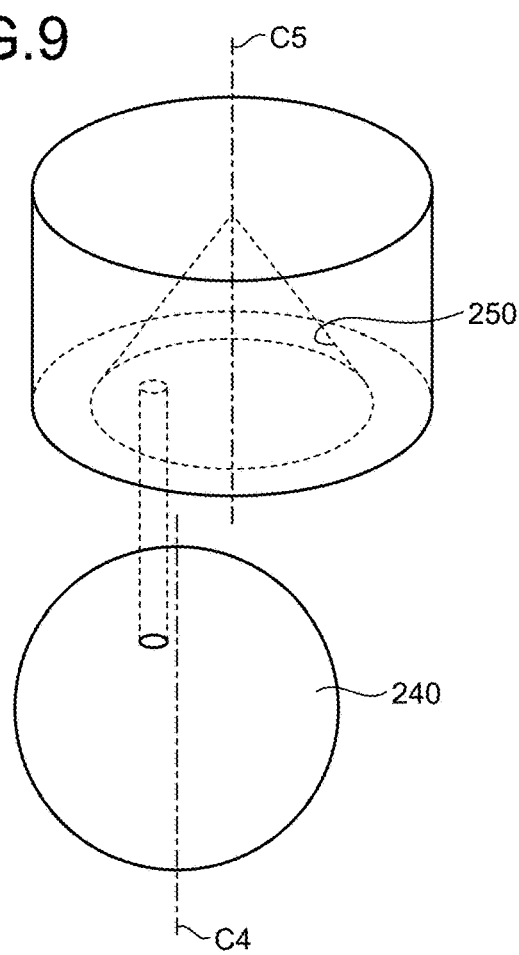
FIG. 9 is a diagram for explaining the state of contact between a sphere and a recessed surface in the state illustrated in FIG. 8.

FIG. 9 is a diagram for explaining the contact between the sphere 240 and the recessed surface 250 in the state illustrated in FIG. 8. With the central axis C4 of the sphere 240 offset from the central axis C5 of the recessed surface 250, the sphere 240 and the recessed surface 250 partially contact each other, specifically, are in point-to-point contact with each other. Thus, the position of contact between the sphere 240 and the recessed surface 250 is not uniquely determined. When the plate 210 and the holder 220 illustrated in FIG. 8 are separated from, and then reconnected to each other, the plate 210 and the holder 220, which are reconnected to each other, are in a different positional relationship from a pre-separation positional relationship therebetween. If this attaching and detaching apparatus 200 is used in, for example, a laser machining device, it is necessary to readjust the installation angle of a transmission mirror in accordance with the difference between the pre-separation positions of the plate 210 and the holder 220 and the post-reconnection positions of the plate 210 and the holder 220. During the readjustment, the laser machining device has to be stopped, leading to a decrease in productivity.

Figure 10:
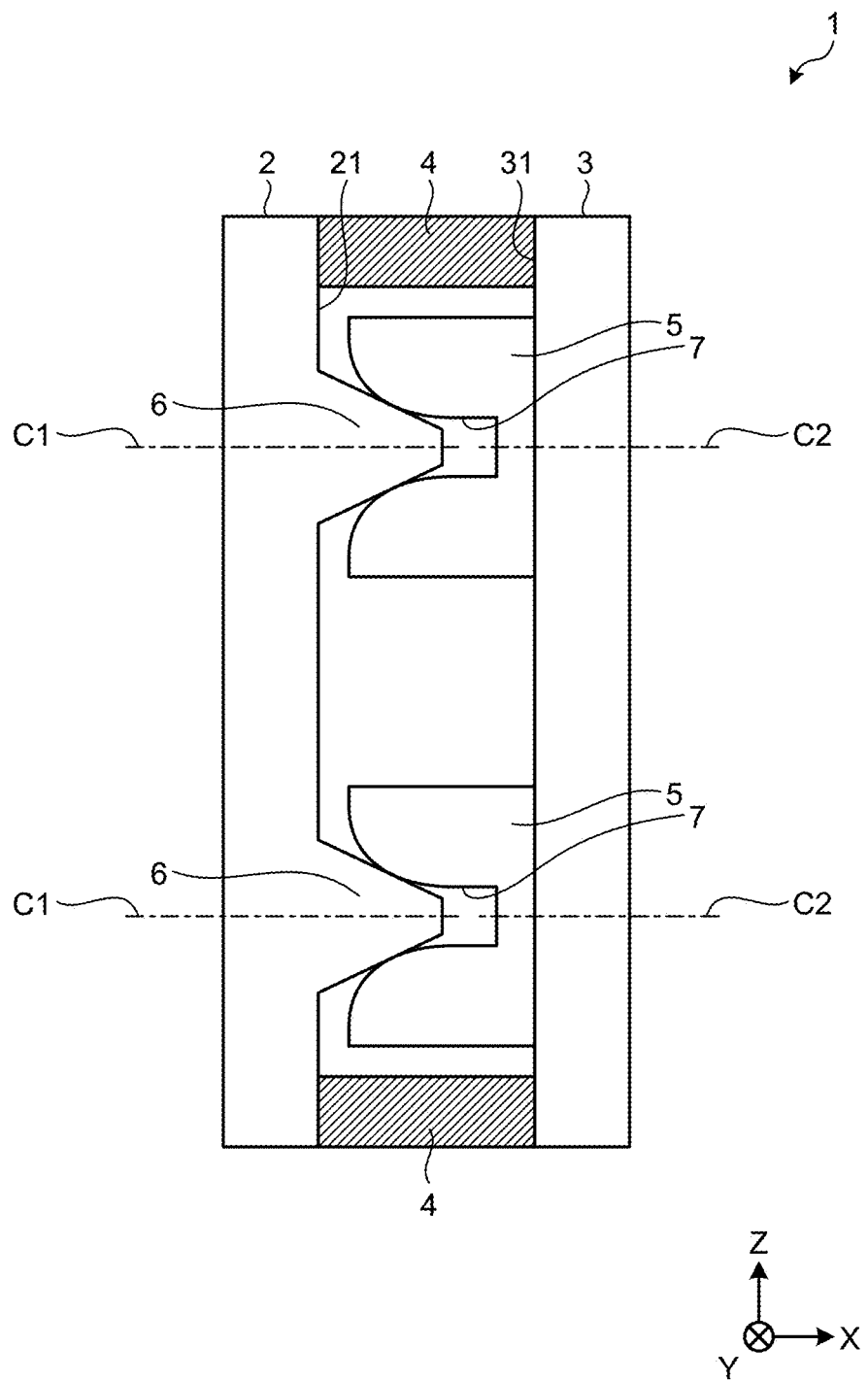
FIG. 10 is a diagram illustrating the attaching and detaching apparatus according to the first embodiment, the diagram illustrating the main mounting plate and the attachment mounting plate that are connected to each other.
Figure 11:
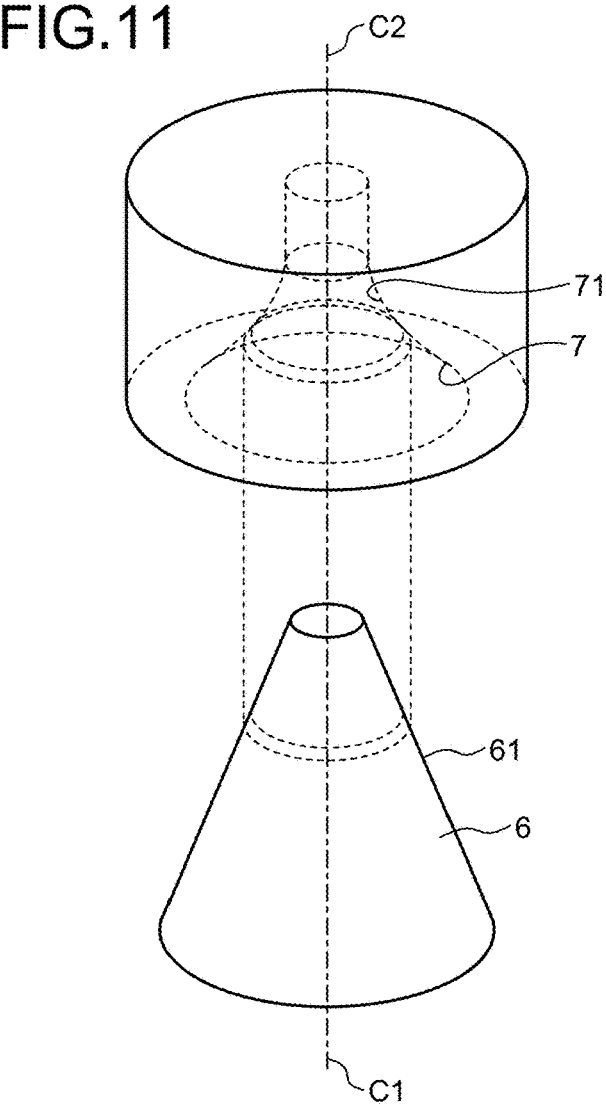
FIG. 11 is a diagram for explaining the contact between a first contact surface of a protrusion and a second contact surface of a hole according to the first embodiment.

FIG. 10 is a diagram illustrating the attaching and detaching apparatus 1 according to the first embodiment, the diagram illustrating the main mounting plate 2 and the attachment mounting plate 3 that are connected to each other. FIG. 11 is a diagram for explaining the contact between the first contact surface 61 of the protrusion 6 and the second contact surface 71 of the hole 7 according to the first embodiment. In FIG. 10, for convenience of explanation, the through holes 33, the bolt holes 53, the bolts 8, etc. are omitted. As illustrated in FIG. 10, in the present embodiment, the attaching and detaching apparatus 1 includes the connecting members 5 that are separate from the main mounting plate 2 and the attachment mounting plate 3. The connecting members 5 in a temporarily fixed state can move in the in-plane direction of the attachment mounting plate 3. Moving the connecting members 5 enables adjusting the relative positions of the holes 7 with respect to the protrusions 6, so that each of the central axes C1 of the protrusions 6 and the corresponding one of the central axes C2 of the holes 7 can easily coincide. That is, the relative positions of the protrusions 6 and the holes 7 are adjusted after the main mounting plate 2, the attachment mounting plate 3, and the connecting members 5 are manufactured, and thus are not affected by manufacturing errors. As illustrated in FIG. 11, with the central axis C1 of the protrusion 6 coinciding with the central axis C2 of the hole 7, the first contact surface 61 of the protrusion 6 and the second contact surface 71 of the hole 7 contact each other along the circumference, that is, at portions that define a circumferential line. Consequently, the positional relationship between the main mounting plate 2 and the attachment mounting plate 3 illustrated in FIG. 10 is accurately determined. That is, the present embodiment can provide the attaching and detaching apparatus 1 having high positioning accuracy at the time the main mounting plate 2 and the attachment mounting plate 3 are connected to each other. When this attaching and detaching apparatus 1 is used in, for example, a laser machining device, laser light can pass through an optical path as designed. Thus, a laser machining device having high beam quality can be provided. Further, since the positional relationship between the main mounting plate 2 and the attachment mounting plate 3 is accurately determined, the main connecting surface 21 of the main mounting plate 2 and the attachment connecting surface 31 of the attachment mounting plate 3 are parallel to each other as designed without the need for surface-to-surface contact between the main mounting plate 2 and the attachment mounting plate 3.

Further, in the present embodiment, the positions of contact between the protrusions 6 and the holes 7 are uniquely determined. If the main mounting plate 2 and the attachment mounting plate 3 are separated from and subsequently reconnected to each other, thus, the positional relationship between the main mounting plate 2 and the attachment mounting plate 3 before the separation is the same as that after the reconnection. Using this attaching and detaching apparatus 1 in, for example, a laser machining device eliminates the need to readjust the installation angle of a transmission mirror every time the main mounting plate 2 and the attachment mounting plate 3 are connected to each other, and can provide a laser machining device of high productivity.

In the present embodiment, an interval is provided between the main mounting plate 2 and the attachment mounting plate 3 without the main mounting plate 2 and the attachment mounting plate 3 in surface-to-surface contact with each other. Thus, if an impact force is applied to the attaching and detaching apparatus 1 due to a collision with a workpiece or something (not illustrated), the attachment mounting plate 3 can rotate relative to the main mounting plate 2 using the interval. Thus, the impact force can be converted into a rotating force and damped, thereby preventing damage to the components of the attaching and detaching apparatus 1.

In the present embodiment, the protrusions 6 are formed on the main mounting plate 2, and the connecting members 5 on which the holes 7 are formed are fixed to the attachment mounting plate 3, but the present invention is not limited thereto. For example, holes may be formed on the main mounting plate 2, and protrusions may be formed on the connecting members 5. Both a protrusion and a hole may be formed on the main mounting plate 2, and the connecting member 5 on which a protrusion is formed and the connecting member 5 on which a hole is formed may be individually fixed to the attachment mounting plate 3. The connecting members 5 on which protrusions, holes, or both a protrusion and a hole are formed may be fixed to the main mounting plate 2. In this case, the main mounting plate 2 to which the connecting members 5 are fixed is the first mounting plate, and the main mounting object 9 is the first mounting object. The main connecting surface 21 is the first connecting surface, and the main mounting surface 22 is the first mounting surface. The attachment mounting plate 3 to which the connecting members 5 are not fixed is the second mounting plate, and the attachment mounting object 10 is the second mounting object. The attachment connecting surface 31 is the second connecting surface, and the attachment mounting surface 32 is the second mounting surface. It is only required to form holes, protrusions, or both a hole and a protrusion on the attachment mounting plate 3 itself.

Figure 12:
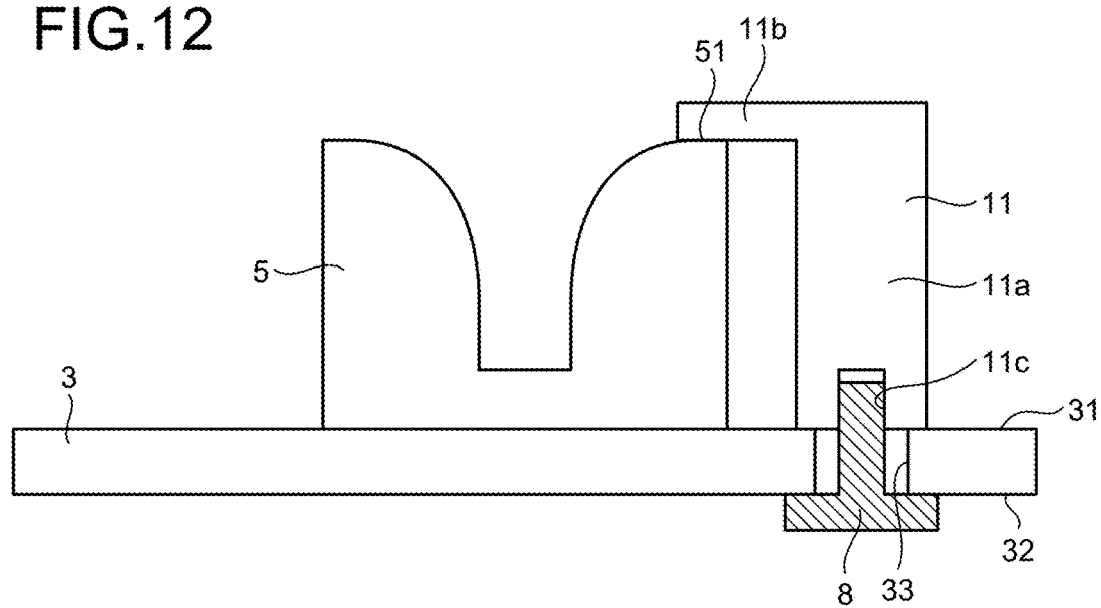
FIG. 12 is a diagram illustrating the attachment mounting plate and the connecting member according to a first modification of the first embodiment.

FIG. 12 is a diagram illustrating the attachment mounting plate 3 and the connecting member 5 according to a first modification of the first embodiment. In the first modification, the same reference numerals are assigned to portions identical to those in the above-described first embodiment to omit explanation. In the first modification, the connecting member 5 is fixed to the attachment mounting plate 3 by a holder 11. The holder 11 is an L-shaped member that presses the connecting member 5 against the attachment mounting plate 3. The holder 11 includes a base portion 11*a* and an abutting portion 11*b*.

The base portion 11*a* is a part extending from the attachment connecting surface 31 toward the main mounting plate (not illustrated). A bolt hole 11*c* for fixing the bolt 8 is formed in the base portion 11*a*. The bolt hole 11*c* has its opening defined by a surface of the base portion 11*a* contacting the attachment connecting surface 31. The inner diameter of the bolt hole 11*c* is equal to the shaft diameter of the bolt 8.

The abutting portion 11*b* is a part that extends from the distal end of the base portion 11*a* toward the connecting member 5 and abuts on a planar portion of the facing surface 51. In the present embodiment, the bolt 8 passing through the through hole 33 of the attachment mounting plate 3 is screwed into the bolt hole 11*c* of the holder 11 to thereby fix the connecting member 5 to the attachment mounting plate 3. That is, the connecting member 5 is fixed to the attachment mounting plate 3 via the holder 11. With the holder 11 fixed to the attachment mounting plate 3, the abutting portion 11*b* of the holder 11 abuts on the planar portion of the facing surface 51 of the connecting member 5, and the connecting member 5 is sandwiched between the abutting portion 11*b* of the holder 11 and the attachment mounting plate 3. This modification can also achieve the same effects as the first embodiment. The connecting member 5 may be fixed to the main mounting plate (not illustrated) with the holder 11, and the protrusion (not illustrated) may be formed on the attachment mounting plate 3.

Figure 13:
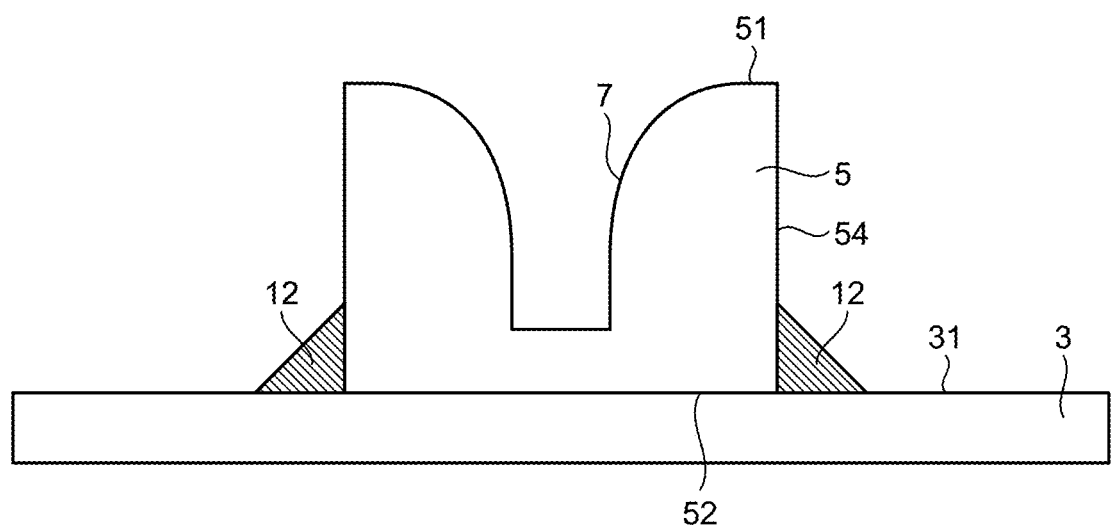
FIG. 13 is a diagram illustrating the attachment mounting plate and the connecting member according to a second modification of the first embodiment.

FIG. 13 is a diagram illustrating the attachment mounting plate 3 and the connecting member 5 according to a second modification of the first embodiment. In the second modification, the same reference numerals are assigned to portions identical to those in the above-described first embodiment to omit explanation. In the second modification, the connecting member 5 is fixed to the attachment mounting plate 3 with a molded resin 12. The connecting member 5 has a side surface 54 interconnecting the facing surface 51 and the abutment surface 52. The side surface 54 is a plane orthogonal to the attachment connecting surface 31. The attachment connecting surface 31 of the attachment mounting plate 3 and the side surface 54 of the connecting member 5 are fixed to each other with the molded resin 12. This modification can also achieve the same effects as the first embodiment. The connecting member 5 may be fixed to the main mounting plate (not illustrated) with the molded resin 12, and the protrusion (not illustrated) may be formed on the attachment mounting plate 3.

Figure 14:
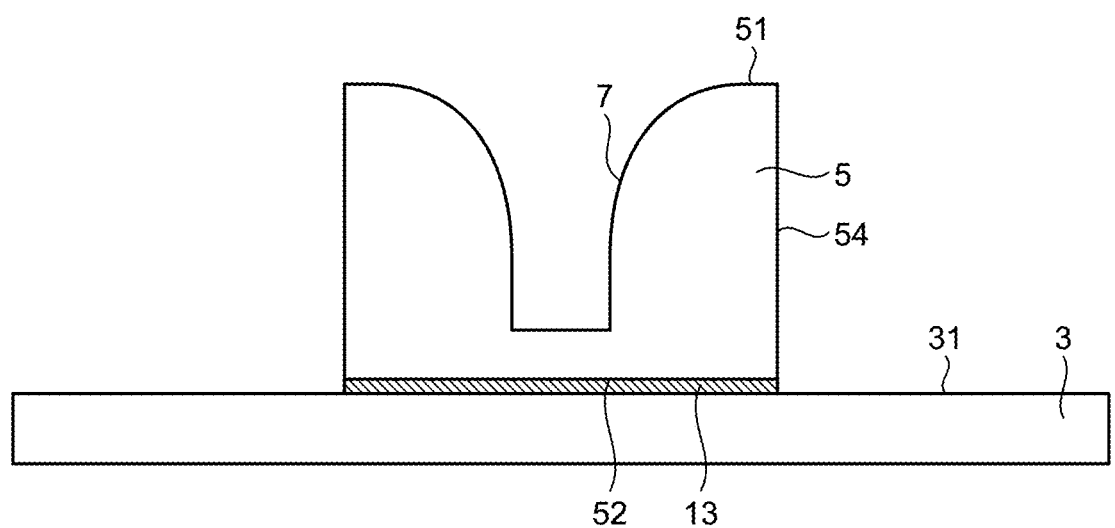
FIG. 14 is a diagram illustrating the attachment mounting plate and the connecting member according to a third modification of the first embodiment.

FIG. 14 is a diagram illustrating the attachment mounting plate 3 and the connecting member 5 according to a third modification of the first embodiment. In the third modification, the same reference numerals are assigned to portions identical to those in the above-described first embodiment to omit explanation. In the third modification, the connecting member 5 is fixed to the attachment mounting plate 3 with an adhesive 13 or a fused metal. The attachment connecting surface 31 of the attachment mounting plate 3 and the abutment surface 52 of the connecting member 5 are fixed to each other via the adhesive 13. This modification can also achieve the same effects as the first embodiment. The connecting member 5 may be fixed to the main mounting plate (not illustrated) with the adhesive 13, and the protrusion (not illustrated) may be formed on the attachment mounting plate 3.

Figure 15:
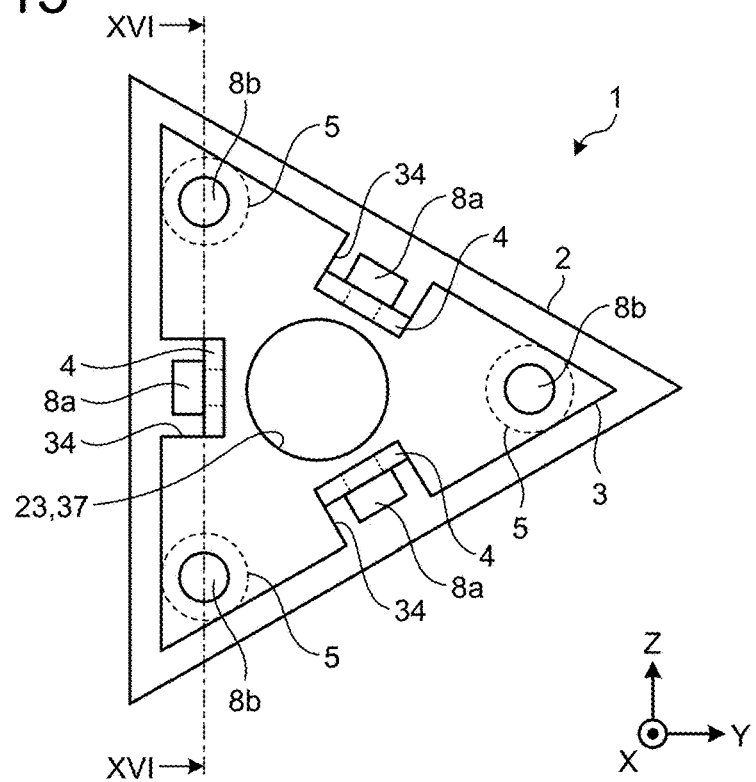
FIG. 15 is a front view illustrating the attaching and detaching apparatus according to a fourth modification of the first embodiment.
Figure 16:
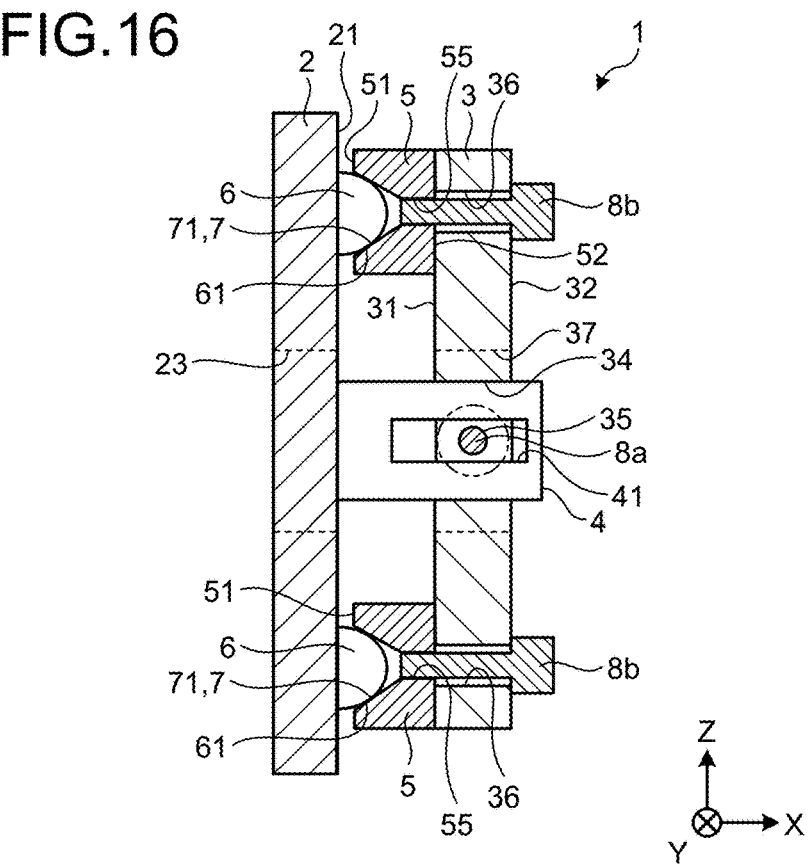
FIG. 16 is a cross-sectional view taken along line XVI-XVI of the attaching and detaching apparatus illustrated in FIG. 15.

FIG. 15 is a front view illustrating the attaching and detaching apparatus 1 according to a fourth modification of the first embodiment. FIG. 16 is a cross-sectional view taken along line XVI-XVI of the attaching and detaching apparatus 1 illustrated in FIG. 15. In the fourth modification, the same reference numerals are assigned to portions identical to those in the above-described first embodiment to omit explanation. As illustrated in FIG. 15, the attaching and detaching apparatus 1 includes the main mounting plate 2, the attachment mounting plate 3, three attracting means 4, three first bolts 8a, three connecting members 5, and three second bolts 8b.

The main mounting plate 2 is formed in a triangular shape as viewed in front elevation. The attachment mounting plate 3 is formed in a triangular shape as viewed in front elevation. A cutout 34, which is in a rectangular shape as viewed in front elevation, is formed on each edge of the attachment mounting plate 3. The main mounting plate 2 is one size larger than the attachment mounting plate 3 as viewed in front elevation.

As illustrated in FIG. 16, a plurality of hemispherical protrusions 6 are formed on the main connecting surface 21 of the main mounting plate 2. The number of the protrusions 6, which is not limited to a particular value, is three in the fourth modification of the first embodiment. In FIG. 16, one protrusion 6 is in a position hidden behind the attracting means 4.

The attracting means 4 are plate-shaped magnets in this modification. The attracting means 4 has a first through hole 41 formed therein for allowing the first bolt 8a to pass through the first through hole. The first through hole 41 is in an elongated hole shape. The first through hole 41 extends in the X-axis direction. A part of the attracting means 4 is inserted into the cutout 34 of the attachment mounting plate 3.

The first bolts 8a are members for fixing the attracting means 4 to the attachment mounting plate 3. The attachment mounting plate 3 has first bolt holes 35 formed therein for fixing the first bolts 8a. The first bolts 8a passing through the first through holes 41 of the attracting means 4 is screwed into the first bolt holes 35 of the attachment mounting plate 3 to thereby allow the attracting means 4 to be sandwiched between the heads of the first bolts 8a and the attachment mounting plate 3, so that the attracting means 4 are fixed to the attachment mounting plate 3.

The facing surface 51 of each connecting member 5 has the hole 7 formed at a position thereof facing the protrusion 6. In this modification, the second contact surface 71 of the hole 7 is formed in a conical surface shape whose diameter increases toward the main mounting plate 2, but may be of a spherical surface shape or the like. In FIG. 16, one connecting member 5 is in a position hidden behind the attracting means 4.

The second bolts 8b are members for fixing the connecting members 5 to the attachment mounting plate 3. The attachment mounting plate 3 has second through holes 36 formed therein for allowing the second bolts 8b to pass through the second through holes 36. The second through holes 36 extend from the attachment mounting surface 32 to the attachment connecting surface 31. The inner diameter of the second through holes 36 is larger than the shaft diameter of the second bolts 8b.

Each connecting member 5 has a second bolt hole 55 formed therein for fixing the second bolt 8b. The second bolt hole 55 is formed from the abutment surface 52 to the hole 7. The second bolt hole 55 communicates with the hole 7. The second bolt 8b passing through the second through hole 36 is screwed into the second bolt hole 55 to thereby fix the connecting member 5 to the attachment mounting plate 3. The inner diameter of the second through hole 36 is larger than the shaft diameter of the second bolt 8b, such that, when the second bolt 8b is loosened, the connecting member 5 can be freely moved in the in-plane direction of the attachment connecting surface 31 of the attachment mounting plate 3. The abutment surface 52 of the connecting member 5 is in contact with the attachment connecting surface 31 of the attachment mounting plate 3.

An opening 23 is formed in the central portion of the main mounting plate 2. An opening 37 is also formed in the central portion of the attachment mounting plate 3. For example, when the attaching and detaching apparatus 1 is used in a laser machining device, the openings 23 and 37 can be used as optical path holes for allowing laser light to pass therethrough.

This modification can also achieve the same effects as the first embodiment. The shapes of the main mounting plate 2 and the attachment mounting plate 3 as viewed in front elevation may be other than the triangular shapes. The numbers of the attracting means 4, the first bolts 8a, the connecting members 5, and the second bolts 8b are three in this modification, but may be one or more other than three. The protrusions 6 may be formed on the connecting members 5, and the holes 7 may be formed on the main mounting plate 2 itself. The number of the connecting members 5 on each of which the protrusion 6 or the hole 7 is formed may be set to one or two, and the protrusion(s) 6 or the hole(s) 7 may be formed on the attachment mounting plate 3 itself.

That is, it is only required that there be at least one connecting member 5 on which the protrusion 6 or the hole 7 is formed.

Figure 17:
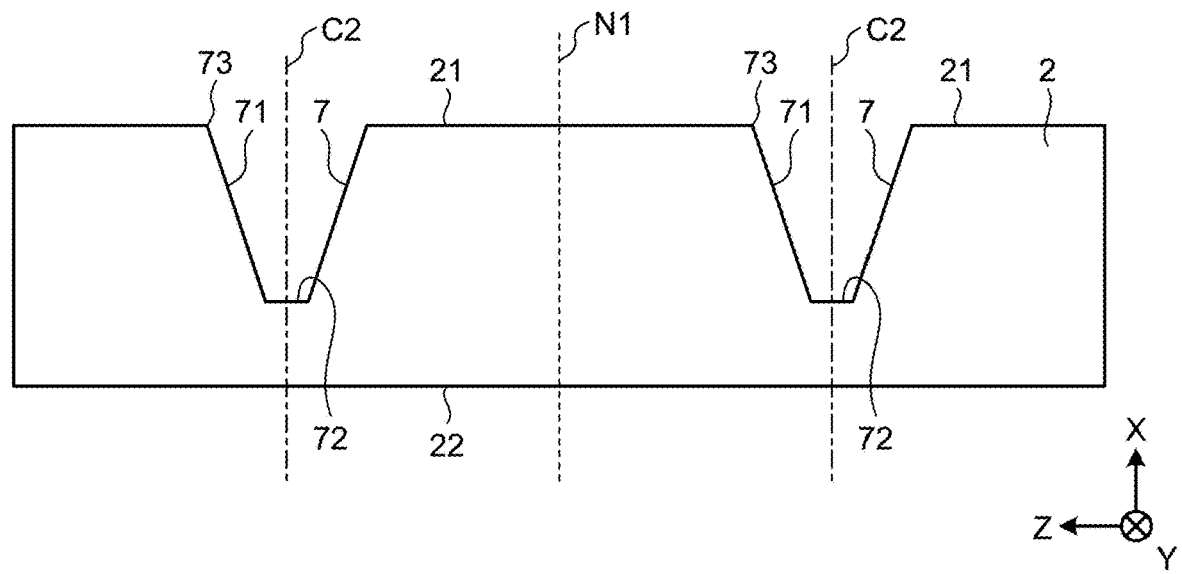
FIG. 17 is a diagram illustrating the main mounting plate according to a fifth modification of the first embodiment.

FIG. 17 is a diagram illustrating the main mounting plate 2 according to a fifth modification of the first embodiment. In the fifth modification, the same reference numerals are assigned to portions identical to those in the above-described first embodiment to omit explanation. In the fifth modification, the holes 7 are formed on the main mounting plate 2. Although not illustrated, the connecting members have the protrusions formed for contact with the inner surfaces of the holes 7. The holes 7 into which the protrusions fit are formed on the main connecting surface 21 of the main mounting plate 2. The second contact surface 71 and the bottom surface 72 are formed On the inner surface of each hole 7. The bottom surface 72 is a plane orthogonal to the X-axis direction. The bottom surface 72 is a part that does not contact the protrusion. The second contact surface 71 is formed on a conical surface whose diameter increases from the bottom surface 72 toward the opening 73. The bottom surface 72 is the bottom of the hole 7. The second contact surface 71 is a part that contacts the protrusion. The second contact surface 71 is formed in the shape of a surface of revolution having the central axis C2. The second contact surface 71 is formed in a shape symmetric about the central axis C2. The central axis C2 is parallel to the normal direction N1 of the main connecting surface 21 of the main mounting plate 2. This modification can also achieve the same effects as the first embodiment.

Figure 18:
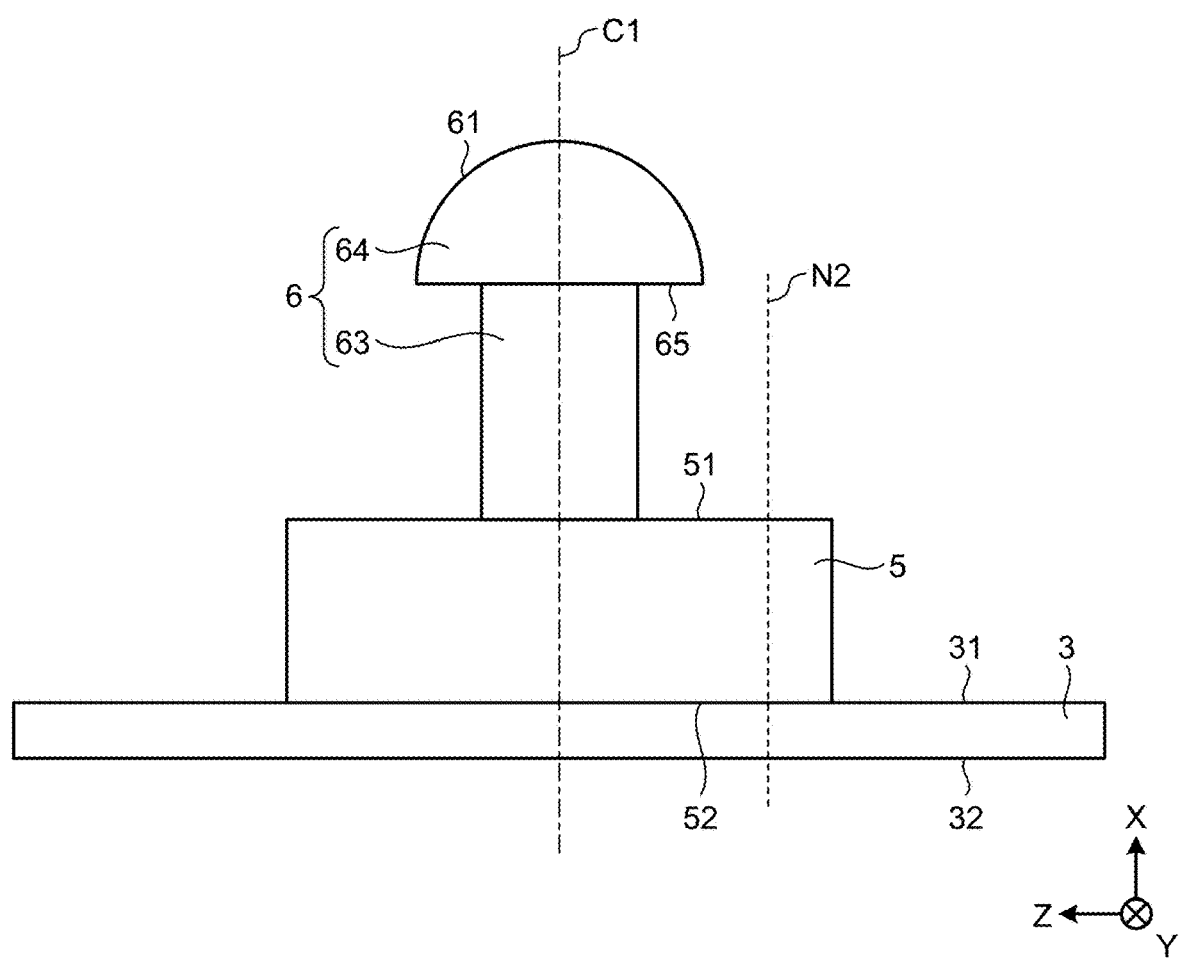
FIG. 18 is a diagram illustrating the attachment mounting plate and the connecting member according to a sixth modification of the first embodiment.

FIG. 18 is a diagram illustrating the attachment mounting plate 3 and the connecting member 5 according to a sixth modification of the first embodiment. In the sixth modification, the same reference numerals are assigned to portions identical to those in the above-described first embodiment to omit explanation. In the sixth modification, the protrusion 6 is formed on the connecting member 5. Although not illustrated, a hole into which the protrusion 6 fits is formed on the main mounting plate. The protrusion 6 projecting toward the main mounting plate (not illustrated) is formed on the facing surface 51 of the connecting member 5. The protrusion 6 has a protrusion proximal end portion 63 and a protrusion distal end portion 64. The protrusion proximal end portion 63 is a columnar part with a constant outer diameter. The protrusion distal end portion 64 is a hemispherical part whose diameter decreases toward the main mounting plate (not illustrated). The first contact surface 61 that contacts the inner surface of the hole (not illustrated) is formed on the protrusion distal end portion 64. The first contact surface 61 is formed in a hemispherical surface shape whose diameter decreases toward the main mounting plate (not illustrated). The first contact surface 61 is formed in the shape of a surface of revolution having the central axis C1. The first contact surface 61 is formed in a shape symmetric about the central axis C1. The central axis C1 is orthogonal to the abutment surface 52 that is a plane abutting on the attachment connecting surface 31. The abutment surface 52 is parallel to the attachment connecting surface 31. Thus, the central axis C1 is parallel to the normal direction N2 of the attachment connecting surface 31 of the attachment mounting plate 3. That is, the central axis C1 is orthogonal to the attachment connecting surface 31 of the attachment mounting plate 3. A stepped surface 65 is formed at the boundary between the protrusion proximal end portion 63 and the protrusion distal end portion 64. The stepped surface 65 is a plane orthogonal to the X-axis direction. With the abutment surface 52 of the connecting member 5 abutting on the attachment connecting surface 31 of the attachment mounting plate 3, the central axis C1 of the first contact surface 61 is parallel to the normal direction N2 of the attachment connecting surface 31 of the attachment mounting plate 3. This modification can also achieve the same effects as the first embodiment.

Figure 19:
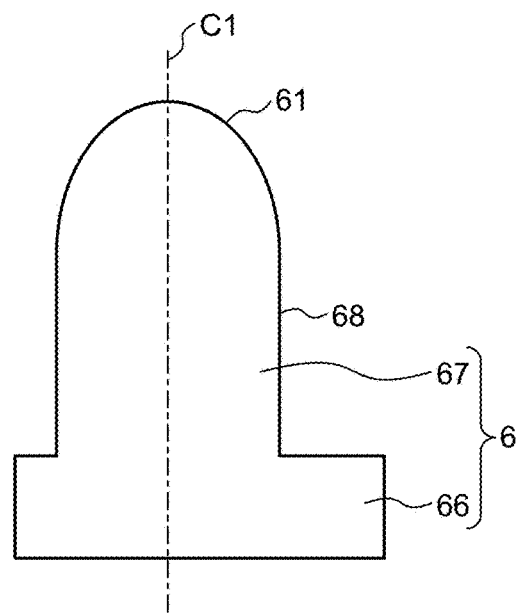
FIG. 19 is a side view illustrating the protrusion according to a seventh modification of the first embodiment.
Figure 20:
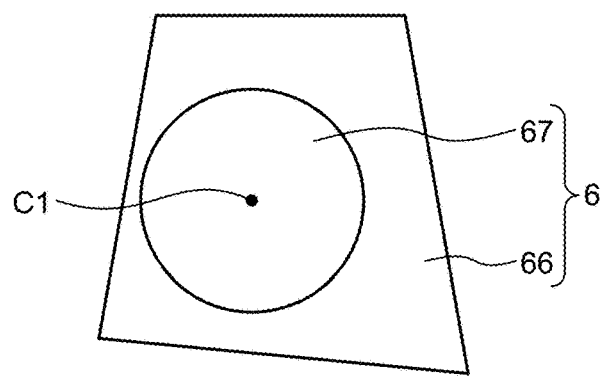
FIG. 20 is a plan view of the protrusion illustrated in FIG. 19.

FIG. 19 is a side view illustrating the protrusion 6 according to a seventh modification of the first embodiment. FIG. 20 is a plan view of the protrusion 6 illustrated in FIG. 19. In the seventh modification, the same reference numerals are assigned to portions identical to those in the above-described first embodiment to omit explanation. The protrusion 6 according to the seventh modification has a protrusion proximal end portion 66 and a protrusion distal end portion 67. The protrusion distal end portion 67 is a part that contacts the inner surface of the hole (not illustrated). The protrusion distal end portion 67 has a circumferential surface 68 and the first contact surface 61. The circumferential surface 68 is continuous with the protrusion proximal end portion 66 and is formed with a constant diameter. The first contact surface 61 is continuous with the distal end of the circumferential surface 68 and is formed in an aspheric surface shape whose diameter decreases in a direction away from the protrusion proximal end portion 66. The first contact surface 61 is formed in the shape of a surface of revolution having the central axis C1. The first contact surface 61 is formed in a shape symmetric about the central axis C1. The protrusion proximal end portion 66 is a part that does not contact the inner surface of the hole. That is, the protrusion proximal end portion 66 is a part that does not contribute to the positioning of the main mounting plate and the attachment mounting plate (not illustrated). Thus, the protrusion proximal end portion 66 is not limited to a particular shape. The shape of the protrusion proximal end portion 66 as viewed in plan may be, for example, an irregular quadrangular shape larger than the outer diameter of the protrusion distal end portion 67 illustrated in FIG. 20. Thus, the protrusion 6 as a whole need not be formed in a shape symmetric about the central axis C1.

Figure 21:
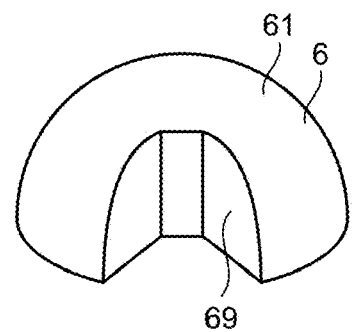
FIG. 21 is a perspective view illustrating the protrusion according to an eighth modification of the first embodiment.
Figure 22:
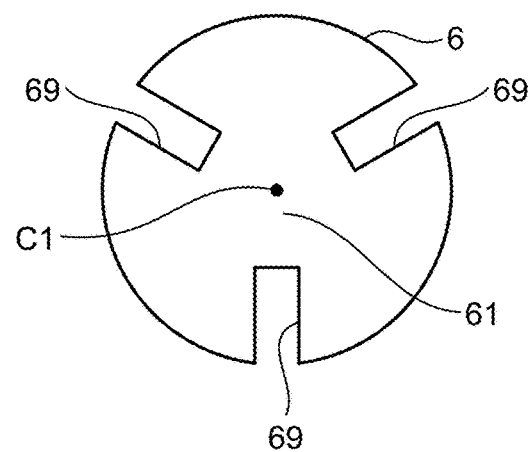
FIG. 22 is a plan view of the protrusion illustrated in FIG. 21.
Figure 23:
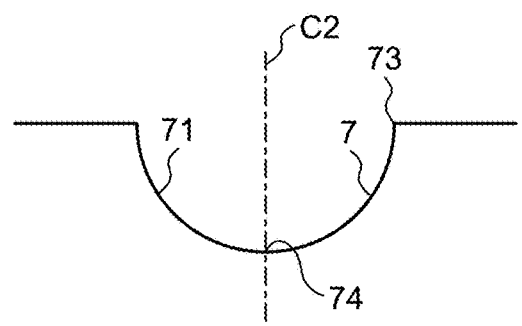
FIG. 23 is a side view illustrating the hole according to the eighth modification of the first embodiment.
Figure 24:
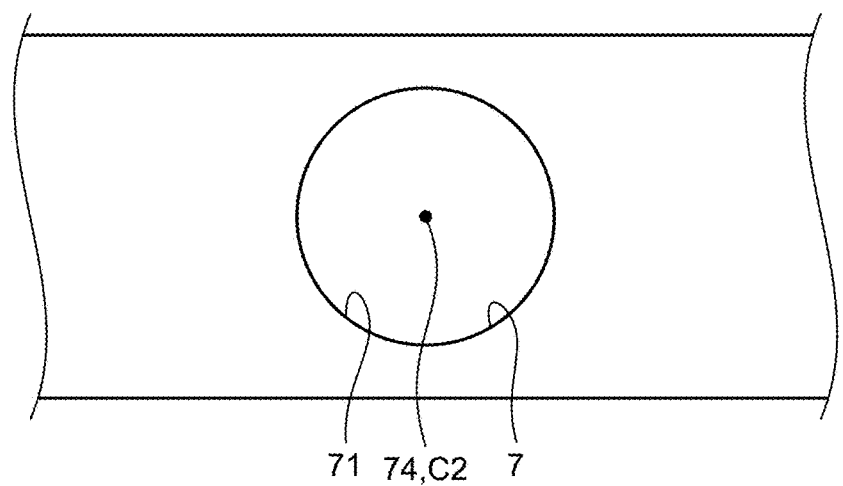
FIG. 24 is a plan view of the hole illustrated in FIG. 23.

FIG. 21 is a perspective view illustrating the protrusion 6 according to an eighth modification of the first embodiment. FIG. 22 is a plan view of the protrusion 6 illustrated in FIG. 21. FIG. 23 is a side view illustrating the hole 7 according to the eighth modification of the first embodiment. FIG. 24 is a plan view of the hole 7 illustrated in FIG. 23. In the eighth modification, the same reference numerals are assigned to portions identical to those in the above-described first embodiment to omit explanation. As illustrated in FIG. 21, the overall shape of the protrusion 6 according to the eighth modification is substantially hemispherical. The protrusion 6 has the first contact surface 61 and cutouts 69. The first contact surface 61 is a part that contacts the inner surface of the hole 7 illustrated in FIG. 23. The first contact surface 61 is formed in a hemispherical surface shape whose diameter decreases from the base to the tip of the protrusion 6. The first contact surface 61 is formed in the shape of a surface of revolution having the central axis C1. The first contact surface 61 is formed in a shape symmetric about the central axis C1. The number of the cutouts 69, which is not limited to a particular value, is, in this modification illustrated in FIG. 22, three spaced at equal angular intervals along the circumferential direction of the protrusion 6. The cutouts 69 are formed in a part of the protrusion 6 that does not contact the inner surface of the hole 7. Thus, the part of the protrusion 6 that does not contact the hole 7 need not be formed in a shape symmetric about the central axis C1.

As illustrated in FIGS. 23 and 24, the second contact surface 71 that contacts the protrusion 6 is formed on the inner surface of the hole 7 according to the eighth modification. The second contact surface 71 is formed in a hemispherical surface shape whose diameter increases from the bottom 74 of the hole 7 toward the opening 73. The second contact surface 71 is formed in the shape of a surface of revolution having the central axis C2. The second contact surface 71 is formed in a shape symmetric about the central axis C2.

The first contact surface 61 illustrated in FIG. 21 decreases in diameter from the base toward the tip of the protrusion 6. The diameter of the second contact surface 71 illustrated in FIG. 23 increases from the bottom 74 of the hole 7 toward the opening 73. When the protrusion 6 and the hole 7 are used, the first contact surface 61 and the second contact surface 71 contact each other at portions that define a circumferential line with the central axis C1 of the first contact surface 61 coinciding with the central axis C2 of the second contact surface 71. A cutout that does not contact the first contact surface 61 may be formed around the hole 7. This modification can also achieve the same effects as the first embodiment.

Second Embodiment

Figure 25:
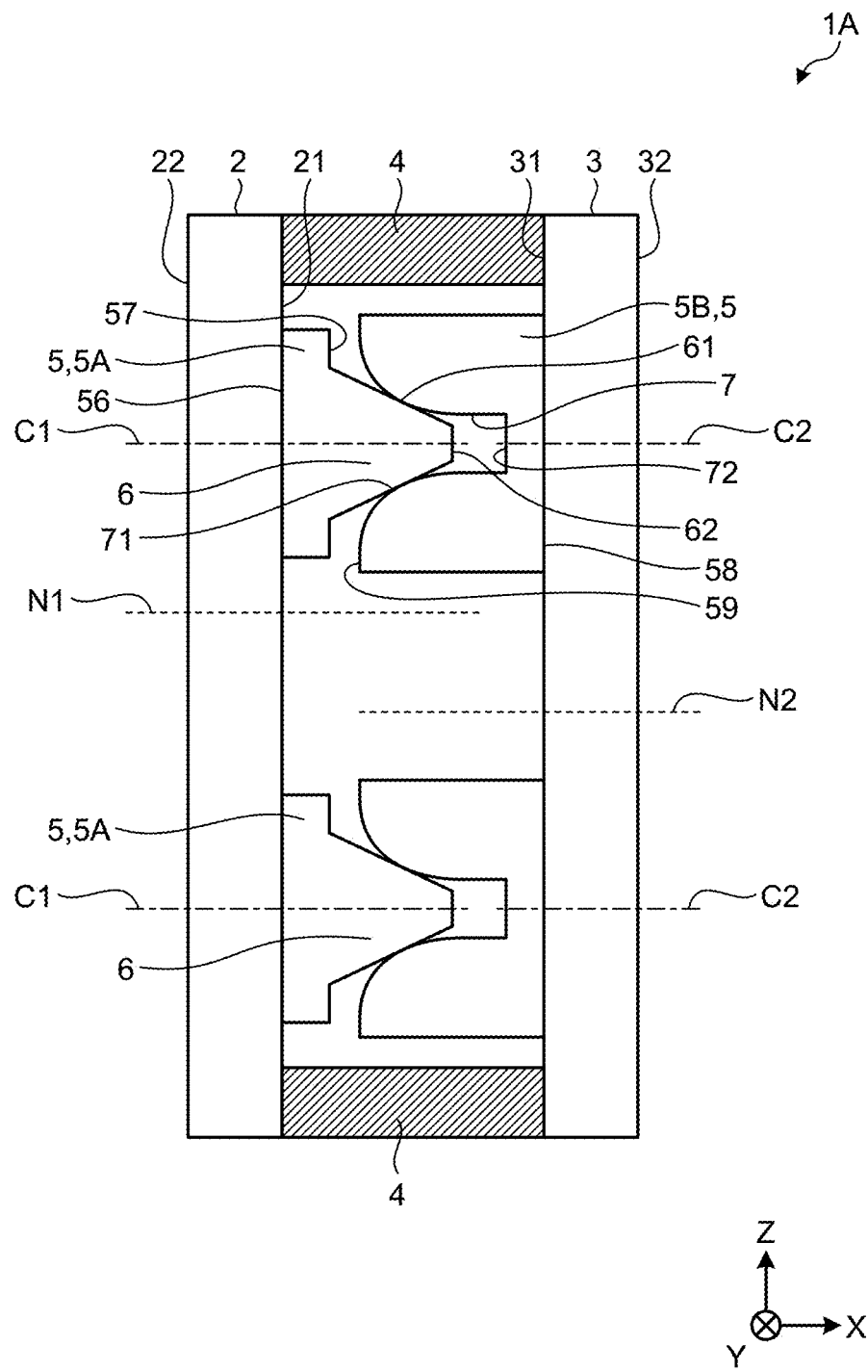
FIG. 25 is a diagram for explaining an attaching and detaching apparatus according to a second embodiment of the present invention.

FIG. 25 is a diagram for explaining an attaching and detaching apparatus 1A according to a second embodiment of the present invention. The attaching and detaching apparatus 1A according to the second embodiment is different from the above-described first embodiment in that the connecting members 5 are mounted to both the main mounting plate 2 and the attachment mounting plate 3. In FIG. 25, for convenience of explanation, bolts for mounting the connecting members 5, through holes and bolt holes into which the bolts are inserted, etc. are omitted. Hereinafter, when the plurality of connecting members 5 are distinguished from each other, one connecting member 5 mounted to the main mounting plate 2 is referred to as a first connecting member 5A, and another connecting member 5 mounted to the attachment mounting plate 3 is referred to as a second connecting member 5B. In the second embodiment, the same reference numerals are assigned to portions identical to those in the above-described first embodiment to omit explanation.

Each first connecting member 5A has a first abutment surface 56 facing the main mounting plate 2 and a first facing surface 57 facing the attachment mounting plate 3. The first abutment surface 56 is a plane abutting on the main connecting surface 21. The first abutment surface 56 is parallel to the main connecting surface 21. The plurality of protrusions 6 projecting toward the attachment mounting plate 3 are formed on the first facing surfaces 57. The plurality of protrusions 6 are spaced from each other. The shape of each of the protrusions 6, which is not limited to a particular shape, is a truncated cone shape whose diameter decreases toward the attachment mounting plate 3 in the present embodiment. The protrusion 6 has the first contact surface 61 and the first top surface 62. The first contact surface 61 is formed in a conical surface shape whose diameter decreases toward the attachment mounting plate 3. The first contact surface 61 is formed in the shape of a surface of revolution having the central axis C1. The first contact surface 61 is formed in a shape symmetric about the central axis C1. The central axis C1 is orthogonal to the first abutment surface 56 that is a plane abutting on the main connecting surface 21. The first abutment surface 56 is parallel to the main connecting surface 21. Thus, the central axis C1 is parallel to the normal direction N1 of the main connecting surface 21 of the main mounting plate 2. That is, the central axis C1 is orthogonal to the main connecting surface 21 of the main mounting plate 2. The first top surface 62 is continuous with the distal end of the first contact surface 61. The first top surface 62 is a plane orthogonal to the X-axis direction.

Each second connecting member 5B has a second abutment surface 58 facing the attachment mounting plate 3 and a second facing surface 59 facing the main mounting plate 2. The configuration of the second connecting members 5B is the same as that of the connecting members 5 according to the first embodiment. The hole 7 into which the protrusion 6 fits is formed on the second facing surface 59. The second contact surface 71 formed on the inner surface of the hole 7 is formed in the shape of a surface of revolution having the central axis C2. The second contact surface 71 is formed in a shape symmetric about the central axis C2. The central axis C2 is orthogonal to the second abutment surface 58 that is a plane abutting on the attachment connecting surface 31. The second abutment surface 58 is parallel to the attachment connecting surface 31. Thus, the central axis C2 is parallel to the normal direction N2 of the attachment connecting surface 31 of the attachment mounting plate 3. That is, the central axis C2 is orthogonal to the attachment connecting surface 31 of the attachment mounting plate 3.

Although not illustrated, through holes for allowing bolts to pass therethrough are formed in each of the main mounting plate 2 and the attachment mounting plate 3. The inner diameter of each through hole is larger than the shaft diameter of the bolt. A bolt hole for fixing the bolt is formed in each of the first connecting members 5A and the second connecting members 5B. The bolts passing through the through holes of the main mounting plate 2 are screwed into the bolt holes of the first connecting members 5A to thereby fix the first connecting members 5A to the main mounting plate 2. The bolts passing through the through holes of the attachment mounting plate 3 are screwed into the bolt holes of the second connecting members 5B to thereby fix the second connecting members 5B to the attachment mounting plate 3. In the present embodiment, the main mounting plate 2 to which the first connecting members 5A are fixed is the first mounting plate, and the main mounting object 9 (not illustrated) to be mounted to the main mounting plate 2 is the first mounting object. In the present embodiment, the main connecting surface 21 is the first connecting surface, and the main mounting surface 22 is the first mounting surface. The attachment mounting plate 3 to which the second connecting members 5B are fixed is the second mounting plate, and the attachment mounting object 10 (not illustrated) to be mounted to the attachment mounting plate 3 is the second mounting object. In the present embodiment, the attachment connecting surface 31 is the second connecting surface, and the attachment mounting surface 32 is the second mounting surface.

Using one of the fixing methods in the first embodiment and the first to third modifications described above, the connecting members 5 may be fixed to the main mounting plate 2 and the attachment mounting plate 3. For a method of assembling the attaching and detaching apparatus 1A, for example, it is desirable to first fix the first connecting members 5A having the protrusions 6 to the main mounting plate 2. This allows the attaching and detaching apparatus 1A to be assembled following the procedure of the assembling method according to the first embodiment described above. Alternatively, the second connecting members 5B having the holes 7 are fixed to the attachment mounting plate 3, following which the first connecting members 5A having the protrusions 6 are fixed to the main mounting plate 2.

The present embodiment can also achieve the same effects as the first embodiment. That is, with the central axes C1 of the protrusions 6 coinciding with the central axes C2 of the holes 7, the main connecting surface 21 of the main mounting plate 2 and the attachment connecting surface 31 of the attachment mounting plate 3 can be exactly parallel to each other. If this attaching and detaching apparatus 1A is used in, for example, a laser machining device, an actual path of laser light passing through the attaching and detaching apparatus 1A agrees with a designed optical path. Thus, a laser machining device capable of higher-quality processing than before can be provided. Further, since the first contact surfaces 61 of the protrusions 6 and the second contact surfaces 71 of the holes 7 contact each other at portions that define a circumferential line, the positional relationship between the main mounting plate 2 and the attachment mounting plate 3 is accurately determined. That is, the present embodiment can provide the attaching and detaching apparatus 1A having high positioning accuracy at the time the main mounting plate 2 and the attachment mounting plate 3 are connected to each other. When this attaching and detaching apparatus 1A is used in, for example, a laser beam machining device, laser light can pass through an optical path as designed. Thus, a laser machining device having high beam quality can be provided. Further, the positions of contact between the protrusions 6 and the holes 7 are uniquely determined. If the main mounting plate 2 and the attachment mounting plate 3 are separated from and subsequently reconnected to each other, thus, the positional relationship between the main mounting plate 2 and the attachment mounting plate 3 before the separation is the same as that after the reconnection. Using this attaching and detaching apparatus 1A in, for example, a laser machining device eliminates the need to readjust the installation angle of a transmission mirror every time the main mounting plate 2 and the attachment mounting plate 3 are connected to each other, and can provide a laser machining device of high productivity.

Not all the protrusions 6 of the first connecting members 5A need to contact all the holes 7 of the second connecting members 5B. Rather, the attaching and detaching apparatus 1A may partially include a location where the protrusion 6 of the first connecting member 5A is in contact with the hole 7 formed on the attachment mounting plate 3 itself, or where the hole 7 of the second connecting member 5B is in contact with the protrusion 6 formed on the main mounting plate 2 itself.

Further, in the present embodiment, the protrusions 6 are formed on the first connecting members 5A, and the holes 7 are formed on the second connecting members 5B, but the present invention is not limited thereto. For example, the holes 7 may be formed on the first connecting members 5A, and the protrusions 6 may be formed on the second connecting members 5B. Further, the first connecting member 5A and the second connecting member 5B on which the protrusions 6 are formed may be used in combination with the first connecting member 5A and the second connecting member 5B on which the holes 7 are formed.

Third Embodiment

Figure 26:
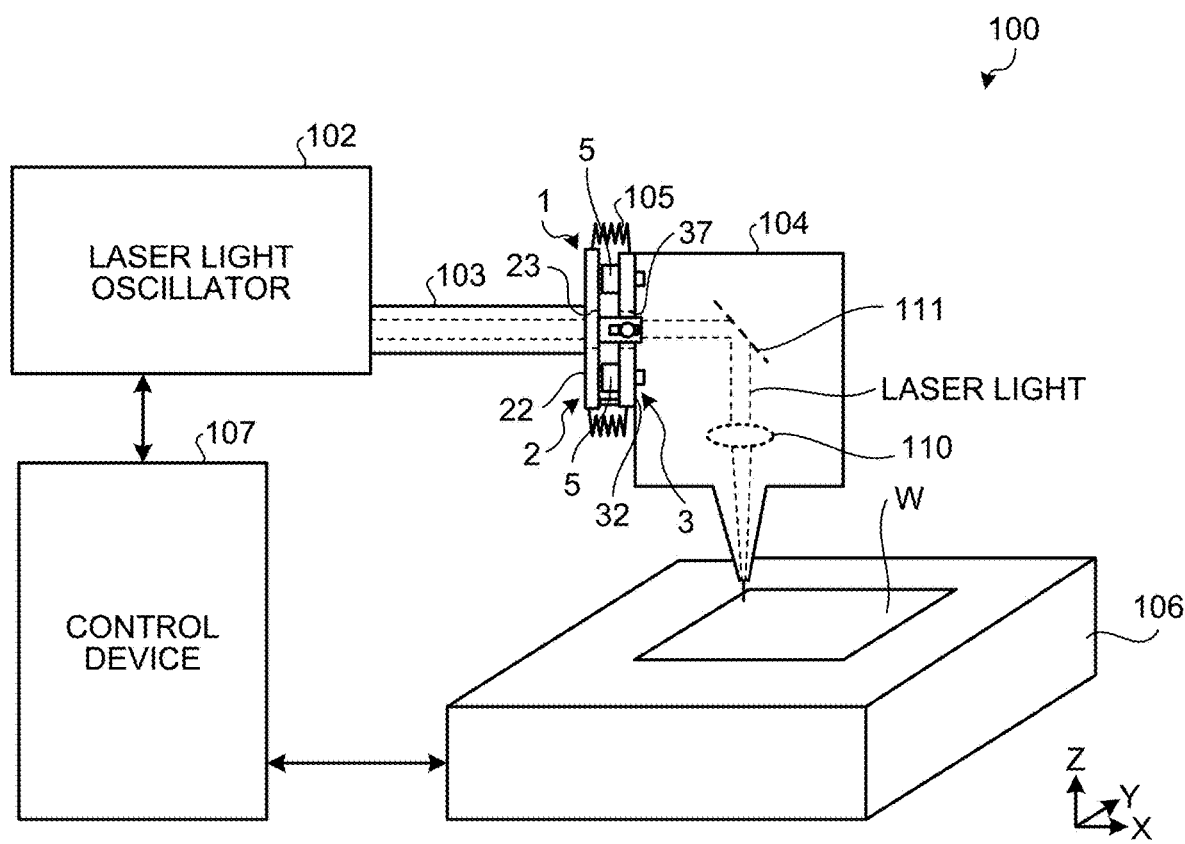
FIG. 26 is a diagram for explaining a configuration example of a laser machining device according to a third embodiment of the present invention.

FIG. 26 is a diagram for explaining a configuration example of a laser machining device 100 according to a third embodiment of the present invention. In the third embodiment, an example will be described in which the attaching and detaching apparatus 1 according to the first embodiment is applied to the laser machining device 100. In the third embodiment, the same reference numerals are assigned to portions identical to those in the above-described first embodiment to omit explanation.

The laser machining device 100 according to the third embodiment is a machine that performs machining, welding, or the like on a workpiece W. The laser beam machining device 100 includes a laser light oscillator 102, an optical path pipe 103, a machining head 104, and the attaching and detaching apparatus 1. The laser light oscillator 102 emits laser light. The optical path pipe 103 allows the laser light emitted from the laser light oscillator 102 to pass therethrough. The machining head 104 emits the laser light to the workpiece W. The attaching and detaching apparatus 1 interconnects the optical path pipe 103 and the machining head 104. The optical path pipe 103 is mounted to the main mounting surface 22 of the attaching and detaching apparatus 1. The machining head 104 is mounted to the attachment mounting surface 32 of the attaching and detaching apparatus 1. The connecting members 5 are fixed to the attachment mounting plate 3. In the present embodiment, the main mounting plate 2 to which the connecting members 5 are not fixed is the second mounting plate, and the optical path pipe 103 mounted to the main mounting plate 2 is the second mounting object. In the present embodiment, the main connecting surface 21 is the second connecting surface, and the main mounting surface 22 is the second mounting surface. The attachment mounting plate 3 to which the connecting members 5 are fixed is the first mounting plate, and the machining head 104 mounted to the attachment mounting plate 3 is the first mounting object. In the present embodiment, the attachment connecting surface 31 is the first connecting surface, and the attachment mounting surface 32 is the first mounting surface.

The laser machining device 100 includes a bellows 105, a movable table 106, and a control device 107. The bellows 105 is mounted across the main mounting plate 2 and the attachment mounting plate 3 and covers the attaching and detaching apparatus 1. The movable table 106 has the workpiece W placed thereon. The control device 107 controls the laser light oscillator 102 and the movable table 106. The movable table 106 can change the relative position of the workpiece W with respect to the machining head 104 in the X-axis direction and the Y-axis direction under the control of the control device 107. FIG. 26 illustrates a cross section of the bellows 105 for convenience.

The control device 107 controls the laser light oscillator 102 such that the laser light oscillator 102 emits laser light. The laser light emitted from the laser light oscillator 102 propagates in the optical path pipe 103, then passes through the openings 23 and 37 formed in the attaching and detaching apparatus 1, and enters the machining head 104.

The machining head 104 includes a transmission mirror 111 and a lens 110. The laser light entering the machining head 104 is concentrated onto the surface of the workpiece W by the transmission mirror 111 and the lens 110. The workpiece W is heated to a high temperature and melted by the laser light concentrated onto the surface. At this time, the movable table 106 on which the workpiece W is placed is moved in the X-axis and Y-axis directions under the control of the control device 107, and the workpiece W is cut or welded into a desired shape.

During a check of operation of the laser machining device 100 or during machining on the workpiece W by the laser machining device 100, the machining head 104 can collide with the workpiece W, the movable table 106, or the like. The laser machining device 100 includes a collision detection sensor (not illustrated), and has the function of stopping in an emergency the movement of the movable table 106 or the operation of the laser light oscillator 102 when a collision of the machining head 104 is detected by the collision detection sensor.

Assume that a response time, which is a duration from the timing of the collision of the machining head 104 with the workpiece W, the movable table 106, or the like until the emergency stop of movement of the workpiece W by the movable table 106, is long. In this case, if the laser machining device 100 is not provided with the attaching and detaching apparatus 1, the impact force due to the collision with the movable table 106 or the like is directly transmitted to the machining head 104. Consequently, the machining head 104, the movable table 106, or the like can break down.

On the other hand, in the embodiment, since the laser machining device 100 is provided with the attaching and detaching apparatus 1, the machining head 104 is disconnected from the optical path pipe 103 at the time of the collision before the force acts leading to the breakdown. Thus, the attaching and detaching apparatus 1 can prevent breakdowns of the machining head 104, the movable table 106, and others. A detailed description will be made hereinbelow as to the laser machining device 100 operates when the machining head 104 collides with the workpiece W, the movable table 106, or the like.

If the machining head 104 collides with the workpiece W, the movable table 106, or the like, the impact force due to the collision is transmitted to the attaching and detaching apparatus 1. At this time, the laser machining device 100 activates an emergency stop function when the collision of the machining head 104 is detected by the collision detection sensor. Even if the movable table 106 makes an emergency stop, the impact force acting on the machining head 104 due to the collision is increased by an inertial force or the like.

If the impact force due to the collision exceeds the attracting force of the attaching and detaching apparatus 1, the attaching and detaching apparatus 1 is released from the connected state, thereby separating the main mounting plate 2 and the attachment mounting plate 3 from each other. At this time, the bellows 105 mounted across the main mounting plate 2 and the attachment mounting plate 3 extends, so that the bellows 105 presents the optical path from being exposed to the atmosphere.

The bellows 105, which is mounted across the main mounting plate 2 and the attachment mounting plate 3, thus holds the machining head 104 via the attachment mounting plate 3 to prevent the machining head 104 from falling. This prevents a breakdown of the machining head 104 due to falling.

After the attaching and detaching apparatus 1 is released from the connected state, the cause of the collision is investigated to take measures to prevent collision. When the laser machining device 100 becomes ready to resume machining, the attaching and detaching apparatus 1 is brought to a reconnected state, and the laser machining device 100 resumes machining on the workpiece W.

The attaching and detaching apparatus 1 has good positioning accuracy as described above, and thus can prevent, when brought to the reconnected state, the occurrence of optical-axis deviation of laser light. The laser machining device 100 can perform machining with high accuracy after the attaching and detaching apparatus 1 is brought to the reconnected state. Thus, the laser machining device 100 can resume machining without positioning adjustment at the time the attaching and detaching apparatus 1 is brought to the reconnected state.

As described above, the laser machining device 100 according to the third embodiment includes the attaching and detaching apparatus 1 and the machining head 104 that is fixed to the attachment mounting plate 3 and performs machining or welding on the workpiece W by laser light. Thus, the laser machining device 100 can allow the optical path to be separated from the machining head under the collision force due to an object colliding with the machining head 104, and can avoid damage to the machining head 104. Further, the attaching and detaching apparatus 1 has highly accurate position reproducibility, and thus can prevent the occurrence of optical-axis deviation of laser light. Thus, the laser machining device 100 can resume machining without positioning adjustment at the time the attaching and detaching apparatus 1 is brought to the reconnected state.

Laser light passes through the openings 23 and 37 that are optical path holes formed in the main mounting plate 2 and the attachment mounting plate 3. The attaching and detaching apparatus 1 can be thus easily applied to the laser machining device 100.

The application of the attaching and detaching apparatus 1A according to the second embodiment to the laser machining device 100 also provides the same effects as the application of the attaching and detaching apparatus 1 according to the first embodiment to the laser machining device 100. The attaching and detaching apparatus 1 or 1A may be applied to machining devices other than the laser machining device 100. Although the laser machining device 100 is illustrated in the present embodiment as a machining device on which the attaching and detaching apparatus 1 or 1A is mounted, the attaching and detaching apparatus 1 or 1A can be mounted on a machining device that performs machining by sending out a substance from a machining head and allowing the substance to collide with a workpiece. A machining device on which the attaching and detaching apparatus 1 or 1A can be mounted is, for example, a plasma machining device, a water jet machining device, a gas cutting machine, or a milling machine.

The laser machining device 100 may be provided with a moving means instead of the movable table 106 that carries the workpiece W thereon and moves the relative position of the workpiece W relative to the machining head 104. For example, in place of the movable table 106, the laser machining device 100 may be provided with a moving means that moves the machining head 104 in the directions of three axes, the X-axis, the Y-axis, and the Z-axis, to machine the workpiece W of a three-dimensional shape. In this case, the moving means may be configured to move, for example, the laser light oscillator 102 and the optical path pipe 103, thereby moving the machining head 104 connected to the optical path pipe 103 via the attaching and detaching apparatus 1.

Fourth Embodiment

Figure 27:
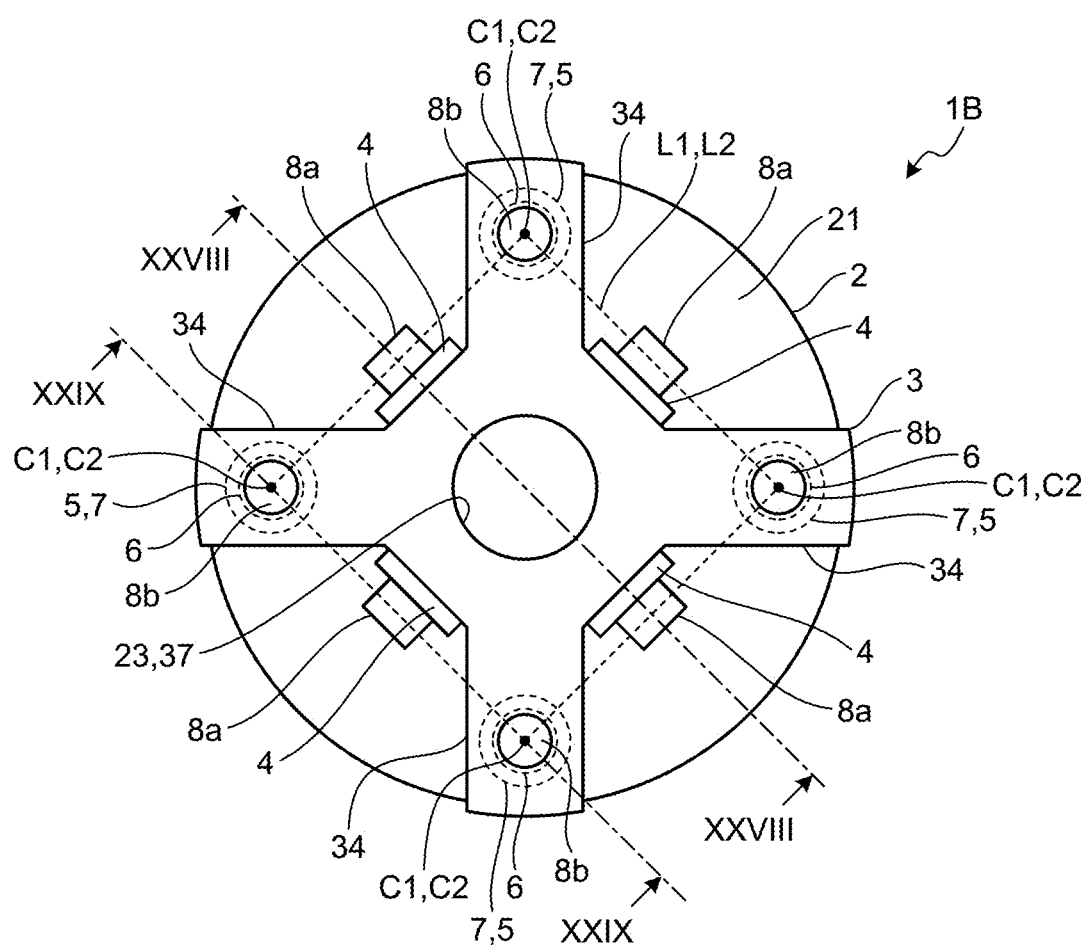
FIG. 27 is a front view illustrating an attaching and detaching apparatus according to a fourth embodiment of the present invention.

FIG. 27 is a front view illustrating an attaching and detaching apparatus 1B according to a fourth embodiment of the present invention. In the fourth embodiment, the same reference numerals are assigned to portions identical to those in the above-described first embodiment to omit explanation. As illustrated in FIG. 27, the attaching and detaching apparatus 1B includes the main mounting plate 2, the attachment mounting plate 3, four attracting means 4, four first bolts 8a, four connecting members 5, and four second bolts 8b.

The main mounting plate 2 is formed in a circular shape as viewed in front elevation. The attachment mounting plate 3 is formed substantially in a cross shape as viewed in front elevation. Four cutouts 34 are formed on the attachment mounting plate 3 at equal intervals.

Figure 28:
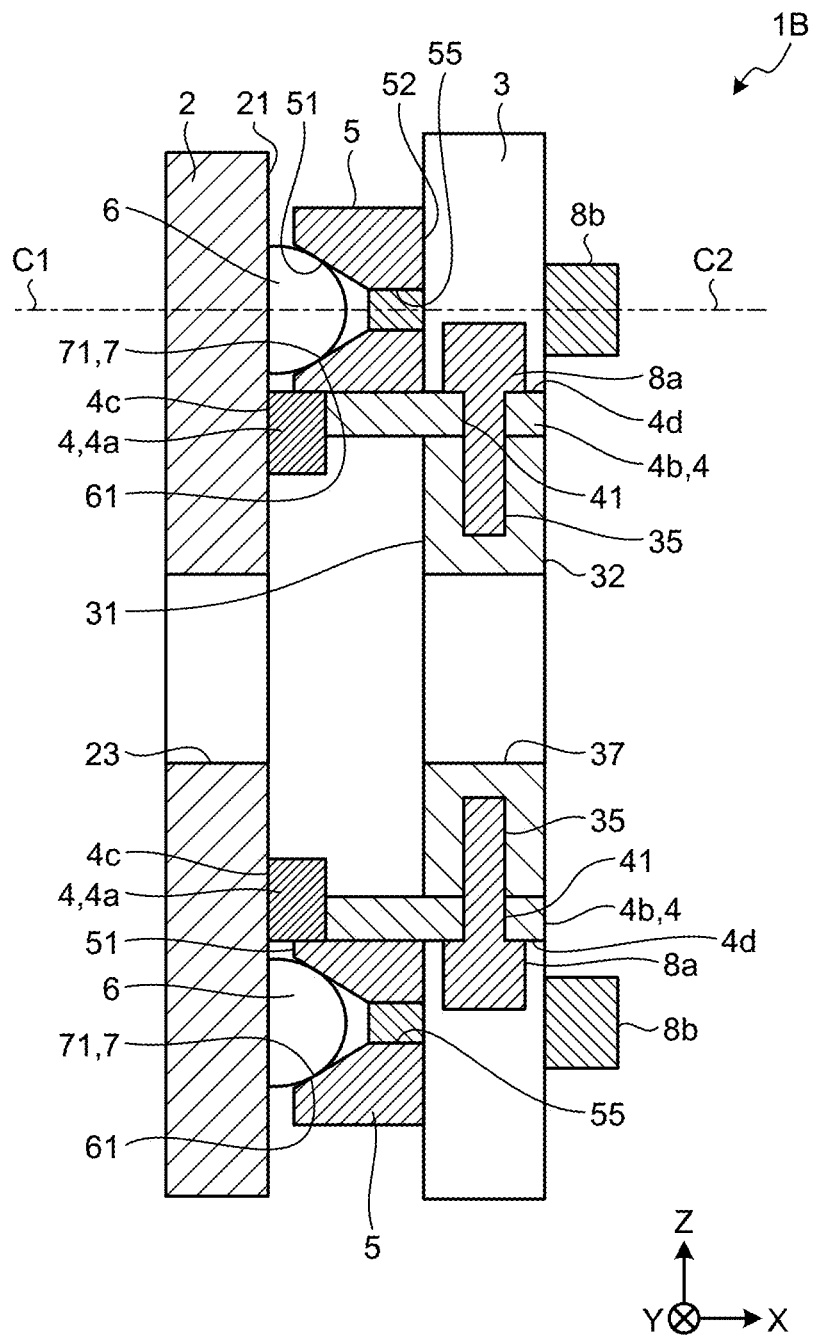
FIG. 28 is a cross-sectional view taken along line XXVIII-XXVIII of the attaching and detaching apparatus illustrated in FIG. 27.

FIG. 28 is a cross-sectional view taken along line XXVIII-XXVIII of the attaching and detaching apparatus 1B illustrated in FIG. 27. In FIG. 28, the connecting members 5 and the second bolts 8b are hatched in cross section for convenience of explanation. As illustrated in FIG. 28, the plurality of hemispherical protrusions 6 are formed on the main connecting surface 21 of the main mounting plate 2. The number of the protrusions 6, which is not limited to a particular value, is four in the present embodiment. In FIG. 28, only two protrusions 6 are illustrated. The opening 23 is formed in the central portion of the main mounting plate 2. The opening 37 is also formed in the central portion of the attachment mounting plate 3. For example, when the attaching and detaching apparatus 1B is used in a laser machining device, the openings 23 and 37 can be used as optical path holes for allowing laser light to pass therethrough.

Figure 29:
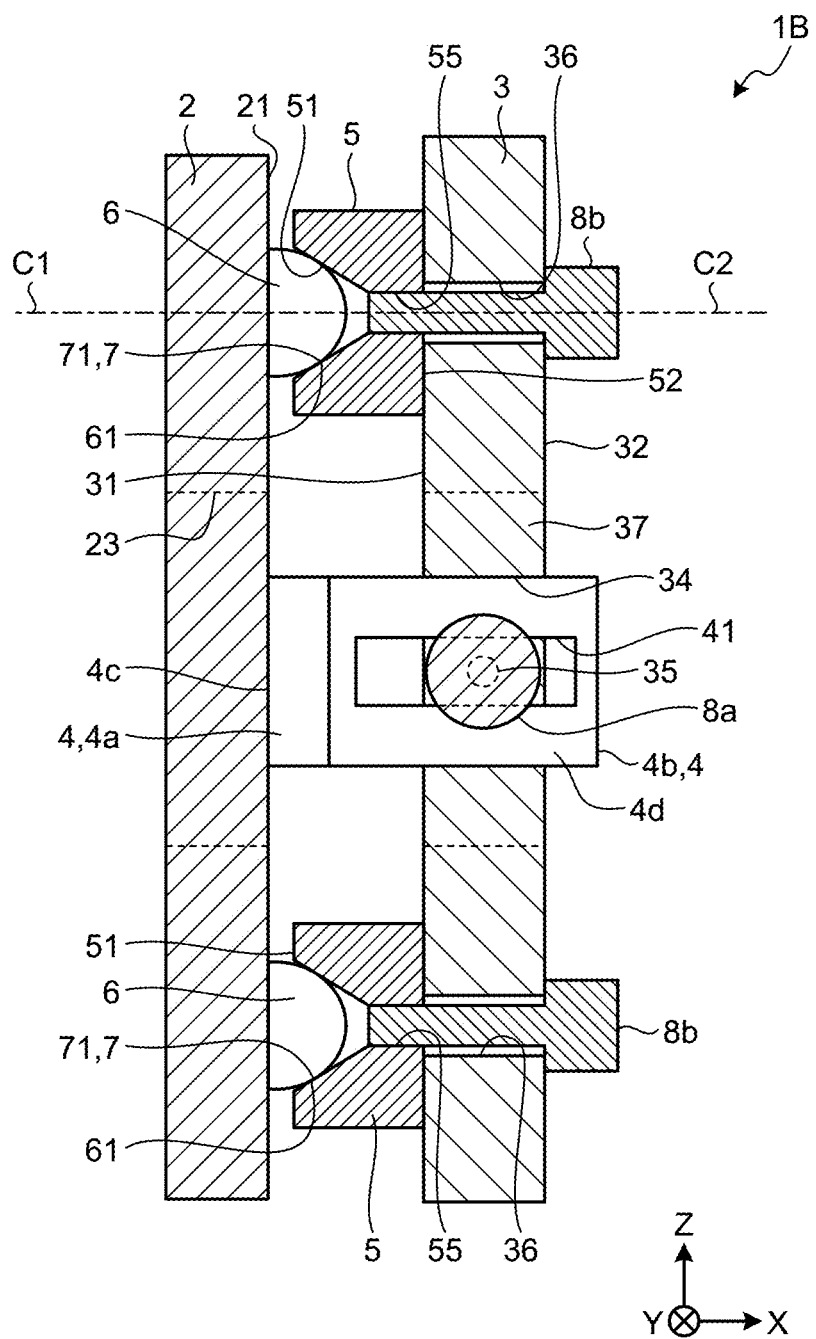
FIG. 29 is a cross-sectional view taken along line XXIX-XXIX of the attaching and detaching apparatus illustrated in FIG. 27.

Each attracting means 4 has a magnet 4a and a plate portion 4b. The magnet 4a has an attracting surface 4c facing the main mounting plate 2. The attracting surface 4c of the magnet 4a is attracted to the main connecting surface 21 of the main mounting plate 2. The plate portion 4b is a metal member formed separately from the magnet 4a. The plate portion 4b is fixed to a surface of the magnet 4a opposite to the attracting surface 4c. The material of the plate portion 4b is, for example, stainless steel. The plate portion 4b has a flat surface 4d orthogonal to the attracting surface 4c of the magnet 4a. The first through hole 41 for allowing the first bolt 8a to pass therethrough is formed in the plate portion 4b. The first through hole 41 has an opening defined by the flat surface 4d. FIG. 29 is a cross-sectional view taken along line XXIX-XXIX of the attaching and detaching apparatus 1B illustrated in FIG. 27. The first through hole 41 is formed in an elongated hole shape longer in the X-axis direction than in the Z-axis direction. A part of the plate portion 4b is inserted into the cutout 34 of the attachment mounting plate 3.

As illustrated in FIG. 28, the first bolts 8a are members for fixing the attracting means 4 to the attachment mounting plate 3. In the attachment mounting plate 3, the first bolt holes 35 for fixing the first bolts 8a are formed. The first bolts 8a passing through the first through holes 41 of the plate portions 4b is screwed into the first bolt holes 35 of the attachment mounting plate 3 to thereby allow the plate portions 4b to be sandwiched between the heads of the first bolts 8a and the attachment mounting plate 3, so that the plate portions 4b are fixed to the attachment mounting plate 3. The central axes of the first through holes 41 and the first bolt holes 35 are parallel to the attachment connecting surface 31 of the attachment mounting plate 3.

On the facing surface 51 of each connecting member 5, the hole 7 is formed at a position facing the protrusion 6. In the present embodiment, the second contact surface 71 of the hole 7 is formed in a conical surface shape whose diameter increases toward the main mounting plate 2, but may be of a spherical surface shape or the like.

As illustrated in FIG. 29, the second bolts 8b are members for fixing the connecting members 5 to the attachment mounting plate 3. The second through holes 36 are formed in the attachment mounting plate 3 for allowing the second bolts 8b to pass through the second through holes. The second through holes 36 extend from the attachment mounting surface 32 to the attachment connecting surface 31. The inner diameter of the second through holes 36 is larger than the shaft diameter of the second bolts 8b.

The second bolt hole 55 for fixing the second bolt 8b is formed in each connecting member 5. The second bolt hole 55 is formed from the abutment surface 52 to the hole 7. The second bolt hole 55 communicates with the hole 7. The second bolts 8b passing through the second through holes 36 is screwed into the second bolt holes 55, thereby fixing the connecting members 5 to the attachment mounting plate 3. The abutment surfaces 52 of the connecting members 5 are in contact with the attachment connecting surface 31 of the attachment mounting plate 3. In the present embodiment, the main mounting plate 2 to which the connecting members 5 are not fixed is the second mounting plate, and the main mounting object 9 (not illustrated) to be mounted to the main mounting plate 2 is the second mounting object. In the present embodiment, the main connecting surface 21 is the second connecting surface, and the main mounting surface 22 is the second mounting surface. The attachment mounting plate 3 to which the connecting members 5 are fixed is the first mounting plate, and the attachment mounting object 10 (not illustrated) to be mounted to the attachment mounting plate 3 is the first mounting object. In the present embodiment, the attachment connecting surface 31 is the first connecting surface, and the attachment mounting surface 32 is the first mounting surface.

The central axes C1 of the protrusions 6 coincide with the central axes C2 of the holes 7. As illustrated in FIG. 27, the plurality of protrusions 6 are disposed such that the central angles are equal. In other words, the protrusions 6 are spaced from one another at equal angular intervals relative to the same center. The number of the protrusions 6, which is not limited to a particular value, is four in the present embodiment. When the individual central axes C1 of the four protrusions 6 are projected onto an imaginary plane parallel to the main connecting surface 21 of the main mounting plate 2 or the attachment connecting surface 31 of the attachment mounting plate 3, imaginary lines connecting the positions of the central axes C1 of the protrusions 6 adjacent to each other form a polygon L1. In the present embodiment, since the four protrusions 6 are disposed at equal angular intervals, the polygon L1 is a regular quadrangle. That is, the four protrusions 6 are disposed at positions corresponding to the apexes of the regular quadrangle.

The plurality of holes 7 are disposed such that the central angles are equal. In other words, the holes 7 are spaced at equal angular intervals relative to the same center. The number of the holes 7 is four in the present embodiment, but is not limited to a particular value as long as the number of the holes 7 is the same as that of the protrusions 6. When the individual central axes C2 of the four holes 7 are projected onto an imaginary plane parallel to the main connecting surface 21 of the main mounting plate 2 or the attachment connecting surface 31 of the attachment mounting plate 3, imaginary lines connecting the positions of the central axes C2 of the holes 7 adjacent to each other form a polygon L2. In the present embodiment, since the four holes 7 are disposed at equal angular intervals, the polygon L2 is a regular quadrangle. That is, the four holes 7 are disposed at positions corresponding to the apexes of the regular quadrangle. Since the central axes C1 of the protrusions 6 coincide with the central axes C2 of the holes 7, the polygon L1 and the polygon L2 are regular quadrangles of the same size.

The attracting means 4 and the protrusions 6 are disposed such that the positions of the attracting means 4 when the attracting means 4 are projected onto an imaginary plane parallel to the main connecting surface 21 of the main mounting plate 2 or the attachment connecting surface 31 of the attachment mounting plate 3 are inside the polygon L1 interconnecting the positions of the central axes C1 of the protrusions 6 adjacent to each other when the individual central axes C1 of the four protrusions 6 are projected onto the imaginary plane. It is only required that the polygon L1 be a polygon that interconnects the positions of the central axes C1 of the protrusions 6 adjacent to each other when the individual central axes C1 of the plurality of protrusions 6 are projected onto an imaginary plane parallel to the main connecting surface 21 of the main mounting plate 2 or the attachment connecting surface 31 of the attachment mounting plate 3, each interior angle of the polygon being less than 180 degrees, the sum of the interior angles being the maximum. The attracting means 4 and the holes 7 are disposed such that the positions of the attracting means 4 when the attracting means 4 are projected onto an imaginary plane parallel to the main connecting surface 21 of the main mounting plate 2 or the attachment connecting surface 31 of the attachment mounting plate 3 are inside the polygon L2 interconnecting the positions of the central axes C2 of the holes 7 adjacent to each other when the individual central axes C2 of the four holes 7 are projected onto the imaginary plane. It is only required that the polygon L2 be a polygon that interconnects the positions of the central axes C2 of the holes 7 adjacent to each other when the individual central axes C2 of the plurality of holes 7 are projected onto an imaginary plane parallel to the main connecting surface 21 of the main mounting plate 2 or the attachment connecting surface 31 of the attachment mounting plate 3, each interior angle of the polygon being less than 180 degrees, the sum of the interior angles being the maximum. The numbers of the protrusions 6 and the holes 7 only need to be three or four or more. That is, the polygons L1 and L2 may be polygons such as triangles, quadrangles, or pentagons. The polygons L1 and L2 are not limited to regular polygons.

The present embodiment can also achieve the same effects as the first embodiment. In the present embodiment, the central axes of the first through holes 41 of the attracting means 4 and the first bolt holes 35 of the attachment mounting plate 3 are parallel to the attachment connecting surface 31 of the attachment mounting plate 3. Specifically, the central axes of the first through holes 41 of the attracting means 4 and the first bolt holes 35 of the attachment mounting plate 3 illustrated in FIG. 28 are parallel to the Z-axis direction and orthogonal to the X-axis direction and the Y-axis direction. The central axes of the first through holes 41 of the attracting means 4 and the first bolt holes 35 of the attachment mounting plate 3 illustrated in FIG. 29 are parallel to the Y-axis direction and orthogonal to the X-axis direction and the Z-axis direction. Thus, if the first bolts 8a are loosened, the attracting means 4 can be freely moved in the X-axis direction and the Y-axis direction or the Z-axis direction. Therefore, after the positions of the attracting means 4 are adjusted so that the attracting surfaces 4c of the magnets 4a are in close contact with the main mounting plate 2, the attracting means 4 can be fixed to the attachment mounting plate 3 with the first bolts 8a. When the attracting surfaces 4c of the magnets 4a are brought into close contact with the main mounting plate 2 in this way, the attracting force of the magnets 4a can be used to the maximum, so that the number of the magnets 4a used can be reduced to reduce the size of the attaching and detaching apparatus 1B.

Figure 30:
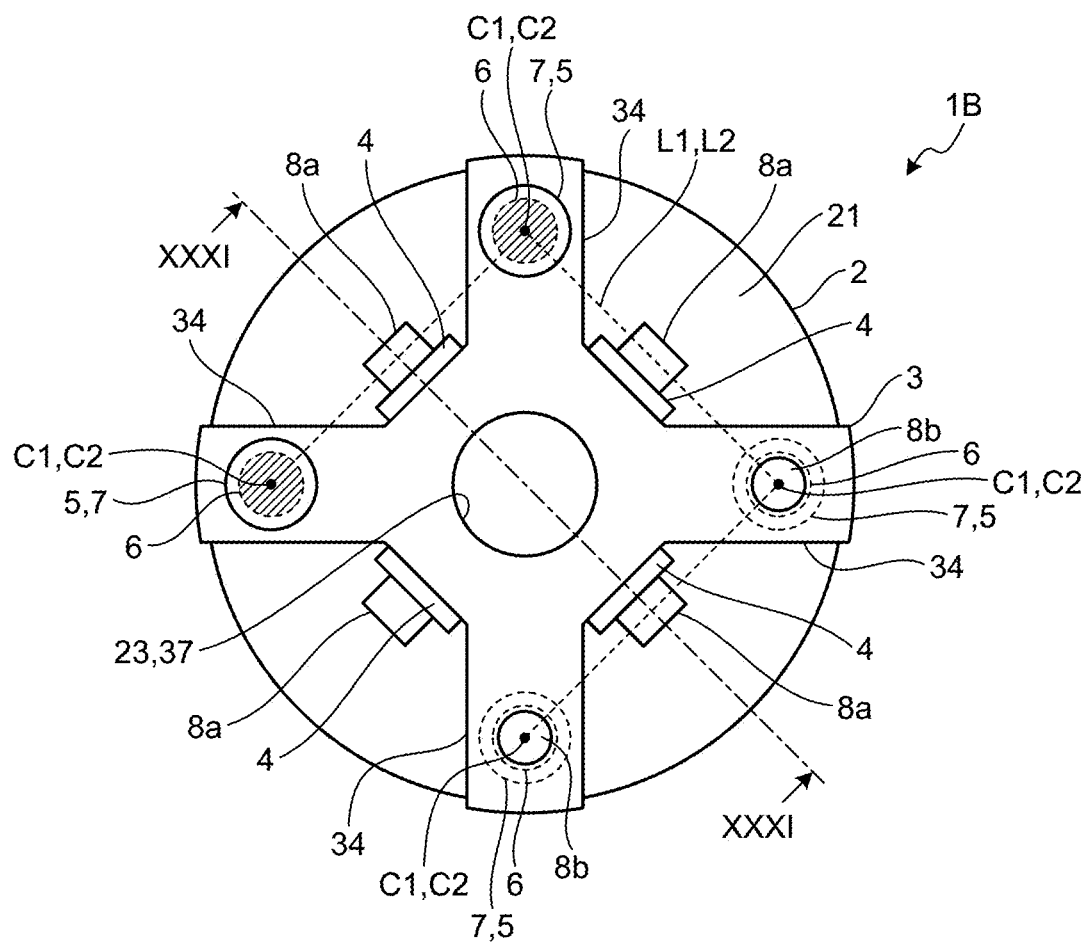
FIG. 30 is a front view illustrating the attaching and detaching apparatus according to the fourth embodiment.
Figure 31:
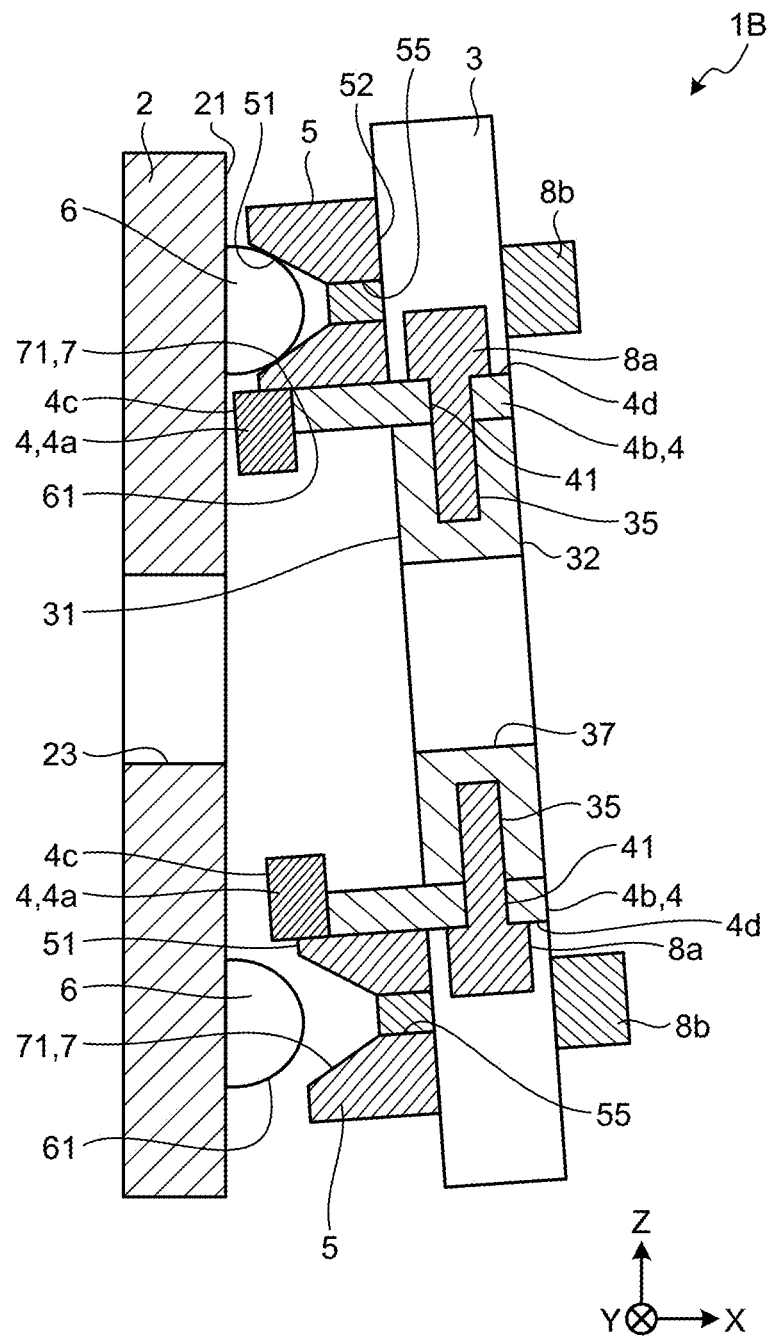
FIG. 31 is a cross-sectional view taken along line XXXI-XXXI of the attaching and detaching apparatus illustrated in FIG. 30.

FIG. 30 is a front view illustrating the attaching and detaching apparatus 1B according to the fourth embodiment. In FIG. 30, for convenience of explanation, hatching is added to the protrusions 6 about which the attaching and detaching apparatus 1B rotates when the machining head (not illustrated) collides with a workpiece. FIG. 31 is a cross-sectional view taken along line XXXI-XXXI of the attaching and detaching apparatus 1B illustrated in FIG. 30. In FIG. 31, the connecting members 5 and the second bolts 8b are hatched in cross section for convenience of explanation. If the machining head (not illustrated) collides with a workpiece, and the impact force due to the collision exceeds the attracting force of the magnets 4a, the main mounting plate 2 and the attachment mounting plate 3 are separated from each other. In the example of FIG. 31, the attachment mounting plate 3 rotates relative to the main mounting plate 2 about the protrusion 6 on the upper side of the sheet surface of FIG. 31, and the connecting member 5 on the lower side of the sheet surface of FIG. 31 is separated from the protrusion 6. At this time, if the attracting means 4, the protrusions 6, and the holes 7 are disposed such that the positions of the attracting means 4 when the attracting means 4 are projected onto an imaginary plane parallel to the main connecting surface 21 of the main mounting plate 2 or the attachment connecting surface 31 of the attachment mounting plate 3 are outside the polygons L1 and L2, the attracting means 4 on the upper side of the sheet surface of FIG. 31 is pressed against the main connecting surface 21 of the main mounting plate 2. As a result, the attracting means 4 is easily damaged. Thus, the attracting means 4 should be more frequently replaced. By contrast, in the present embodiment, the attracting means 4 and the protrusions 6 are disposed such that the positions of the attracting means 4 when the attracting means 4 are projected onto an imaginary plane parallel to the main connecting surface 21 of the main mounting plate 2 or the attachment connecting surface 31 of the attachment mounting plate 3 are inside the polygon L1 that interconnects the positions of the central axes C1 of the protrusions 6 adjacent to each other when the individual central axes C1 of the four protrusions 6 are projected onto the imaginary plane, each interior angle of the polygon being less than 180 degrees, the sum of the interior angles being the maximum. Further, in the present embodiment, the attracting means 4 and the holes 7 are disposed such that the positions of the attracting means 4 when the attracting means 4 are projected onto an imaginary plane parallel to the main connecting surface 21 of the main mounting plate 2 or the attachment connecting surface 31 of the attachment mounting plate 3 are inside the polygon L2 that interconnects the positions of the central axes C2 of the holes 7 adjacent to each other when the individual central axes C2 of the four holes 7 are projected onto the imaginary plane, each interior angle of the polygon being less than 180 degrees, the sum of the interior angles being the maximum. Thus, the attracting means 4 on the upper side of the sheet surface in FIG. 31 is surely separated from the main mounting plate 2. Consequently, the attracting means 4 is less likely to be damaged. Thus, the attracting means 4 should be less frequently replaced.

Fifth Embodiment

Figure 32:
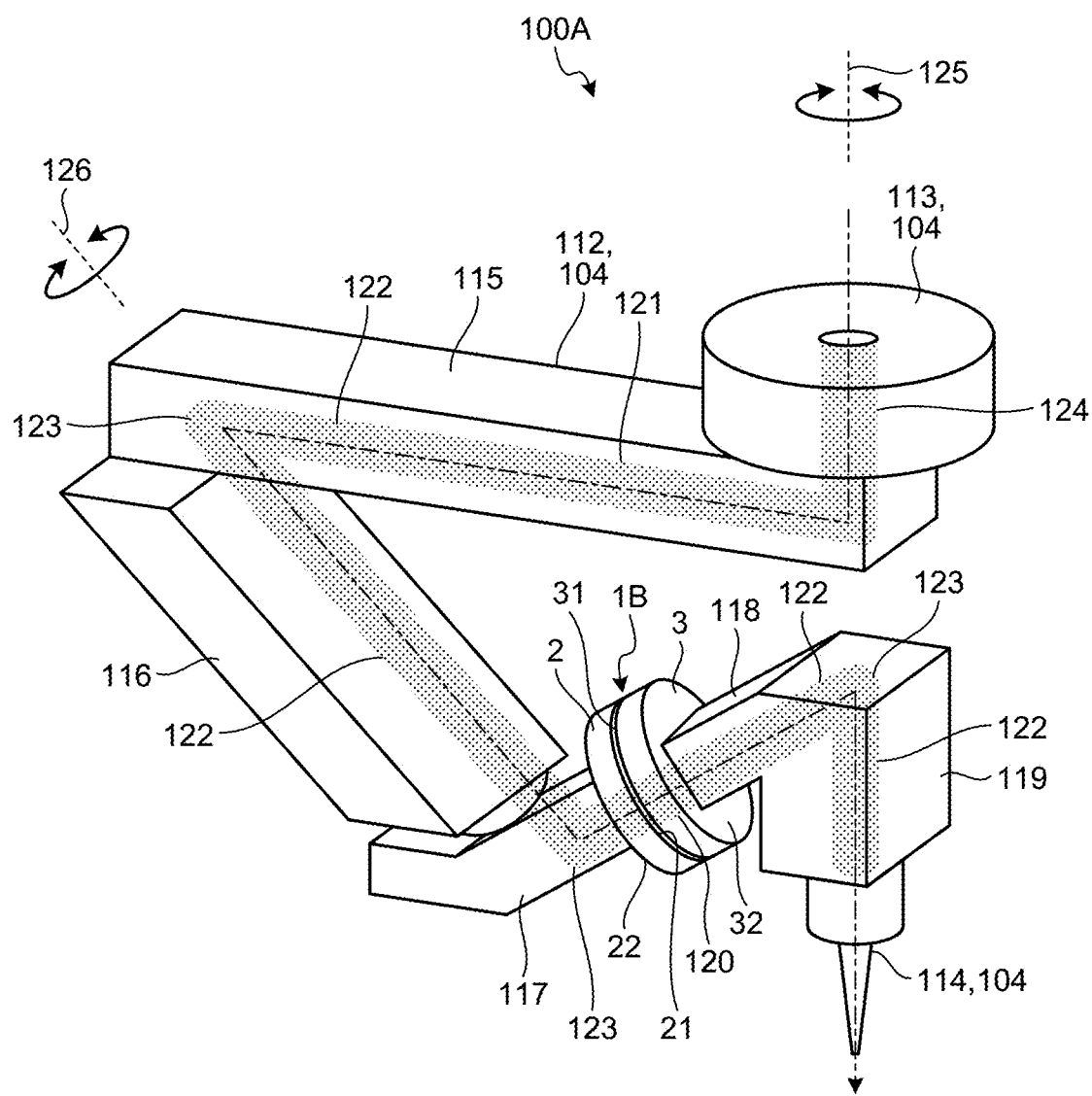
FIG. 32 is a diagram for explaining a configuration example of a laser machining device according to a fifth embodiment of the present invention.

FIG. 32 is a diagram for explaining a configuration example of a laser machining device 100A according to a fifth embodiment of the present invention. In the fifth embodiment, an example will be described in which the attaching and detaching apparatus 1B according to the fourth embodiment is applied to the laser machining device 100A. In the fifth embodiment, the same reference numerals are assigned to portions identical to those in the above-described fourth embodiment to omit explanation. In FIG. 32, the attaching and detaching apparatus 1B is simplified. A chain-line arrow in FIG. 32 indicates the traveling direction of laser light.

The laser machining device 100A according to the fifth embodiment includes an arm 112, a rotation mechanism 113, a condensing unit 114, and the attaching and detaching apparatus 1B.

The arm 112 includes a horizontal portion 115, a first inclined portion 116, a second inclined portion 117, a third inclined portion 118, and a vertical portion 119. Laser light passes through the horizontal portion 115, the first inclined portion 116, the second inclined portion 117, the third inclined portion 118, and the vertical portion 119 in this order. The arm 112 is a part of the machining head 104. The horizontal portion 115 is a portion extending in the horizontal direction. One end of the horizontal portion 115 is connected to the rotation mechanism 113. The first inclined portion 116 is a portion inclined downward from the opposite end of the horizontal portion 115. The second inclined portion 117 is a portion inclined upward from the lower end of the first inclined portion 116. The third inclined portion 118 is located on an extension line of the second inclined portion 117, and is a portion inclined upward. The second inclined portion 117 and the third inclined portion 118 are connected to each other via the attaching and detaching apparatus 1B. The vertical portion 119 is a portion extending downward from the upper end of the third inclined portion 118. The inclination angles of the first inclined portion 116, the second inclined portion 117, and the third inclined portion 118 with respect to the vertical axis are, for example, 45 degrees. The material of the arm 112 is iron in the present embodiment, but may be a metal other than iron, ceramic, resin, or the like as long as the material of the arm has necessary physical properties. A second optical path hole 121 for allowing laser light to pass therethrough is formed inside the arm 112. The second optical path hole 121 is formed with a plurality of straight portions 122 extending linearly and curved portions 123 interconnecting the adjacent straight portions 122. Optical components (not illustrated) that reflect laser light are installed in the curved portions 123.

The rotation mechanism 113 is a mechanism for rotating the arm 112 about a first axis 125. The rotation mechanism 113 is a part of the machining head 104. The first axis 125 is a rotation axis extending in the vertical direction. Although not illustrated, a rotation mechanism is also disposed inside the first inclined portion 116. The rotation mechanism disposed inside the first inclined portion 116 is a mechanism for rotating the second inclined portion 117, the third inclined portion 118, and the vertical portion 119 about a second axis 126. The second axis 126 is a rotation axis parallel to the extending direction of the first inclined portion 116. A third optical path hole 124 for allowing laser light to pass therethrough is formed inside the rotation mechanism 113. The third optical path hole 124 in the rotation mechanism 113 and the second optical path hole 121 in the arm 112 communicate with each other.

The condensing unit 114 includes an optical system for condensing laser light and a nozzle. The condensing unit 114 is a part of the machining head 104. The condensing unit 114 is connected to the distal end of the arm 112. Specifically, the condensing unit 114 is connected to the lower end of the vertical portion 119.

The attaching and detaching apparatus 1B separably connects the second inclined portion 117 and the third inclined portion 118 to each other. The second inclined portion 117 is mounted to the main mounting surface 22 of the attaching and detaching apparatus 1B. The third inclined portion 118 is mounted to the attachment mounting surface 32 of the attaching and detaching apparatus 1B. Although not illustrated, the connecting members 5 are fixed to the attachment mounting plate 3. A first optical path hole 120 of the attaching and detaching apparatus 1B and the second optical path hole 121 of the second inclined portion 117 and the third inclined portion 118 communicate with each other. The attaching and detaching apparatus 1B is disposed to be located between the second inclined portion 117 and the third inclined portion 118 with the central axis of the first optical path hole 120 coinciding with the central axis of the second optical path hole 121 in the second inclined portion 117 and the third inclined portion 118. The term "coinciding" as used herein means not only a state of coinciding completely, but also a state of not exactly coinciding but being slightly off. In the present embodiment, the main mounting plate 2 to which the connecting members 5 are not fixed is the second mounting plate, and the second inclined portion 117 mounted to the main mounting plate 2 is the second mounting object. In the present embodiment, the main connecting surface 21 is the second connecting surface, and the main mounting surface 22 is the second mounting surface. The attachment mounting plate 3 to which the connecting members 5 are fixed is the first mounting plate, and the third inclined portion 118 mounted to the attachment mounting plate 3 is the first mounting object. In the present embodiment, the attachment connecting surface 31 is the first connecting surface, and the attachment mounting surface 32 is the first mounting surface.

Laser light passes through the third optical path hole 124 in the rotation mechanism 113 and enters the second optical path hole 121 of the arm 112. The laser light that has entered the second optical path hole 121 of the arm 112 passes through the first optical path hole 120 of the attaching and detaching apparatus 1B and is reflected by the optical component, such that the laser light is transmitted to reach the condensing unit 114. The laser light condensed by the condensing unit 114 is emitted from the nozzle to a workpiece together with an assist gas.

In the present embodiment, the attaching and detaching apparatus 1B is disposed to be located between the second inclined portion 117 and the third inclined portion 118. Even if the machining head 104 collides head-on with a workpiece or laterally hits a workpiece, thus, the main mounting plate 2 and the attachment mounting plate 3 can be easily separated. As a result, an impact force applied to the machining head 104 during a collision can be reduced.

In the present embodiment, the third inclined portion 118 to which the attaching and detaching apparatus 1B is mounted is connected to the condensing unit 114 via the vertical portion 119, so that the main mounting plate 2 and the attachment mounting plate 3 can be separated by a smaller impact force. Thus, an impact force applied to the machining head 104 during a collision can be further reduced.

In the present embodiment, the central axis of the first optical path hole 120 of the attaching and detaching apparatus 1B coincides with the central axis of the second optical path hole 121 in the second inclined portion 117 and the third inclined portion 118. When the machining head 104 collides with a workpiece, thus, the second optical path hole 121 in the second inclined portion 117 and the second optical path hole 121 in the third inclined portion 118 become out of alignment, and the emission of laser light can be quickly stopped.

The attaching and detaching apparatus 1B may be mounted on the laser machining device 100A having the machining head 104 for workpieces of two-dimensional shapes, or may be mounted on the laser machining device 100A having the machining head 104 for workpieces of three-dimensional shapes. When the machining head 104 for workpieces of three-dimensional shapes is used, the machining head 104 requires higher-accuracy positioning than the machining head 104 for workpieces of two-dimensional shapes. To this end, the attaching and detaching apparatus 1B having high positioning accuracy at the time of connection of the main mounting plate 2 and the attachment mounting plate 3 is mounted on the laser machining device 100A having the machining head 104 for workpieces of three-dimensional shapes, in which case the machining head 104 can be positioned with high accuracy.

Although the laser machining device 100A has been illustrated in the present embodiment as a machining device on which the attaching and detaching apparatus 1B is mounted, the attaching and detaching apparatus 1B can be mounted on a machining device that performs machining by sending out a substance from a machining head and allowing the substance to collide with a workpiece. A machining device on which the attaching and detaching apparatus 1B can be mounted is, for example, a plasma machining device, a water jet machining device, a gas cutting machine, or a milling machine.

The configurations described in the above embodiments illustrate an example of the subject matter of the present invention, and can be combined with another known art, and can be partly omitted or changed without departing from the scope of the present invention.

REFERENCE SIGNS LIST 1, 1A, 1B attaching and detaching apparatus; 2 main mounting plate; 3 attachment mounting plate; 4 attracting means; 4a magnet; 4b plate portion; 4c attracting surface; 4d flat surface; 5 connecting member; 5A first connecting member; 5B second connecting member; protrusion; 7 hole; 8 bolt; 8a first bolt; 8b second bolt; 9 main mounting object; 10 attachment mounting object; 11 holder; 11a base portion; 11b abutting portion; 11c bolt hole; 12 molded resin; 13 adhesive; 21 main connecting surface; 22 main mounting surface; 23, 37 opening; 31 attachment connecting surface; 32 attachment mounting surface; 33 through hole; 34, 69 cutout; 35 first bolt hole; 36 second through hole; 41 first through hole; 51 facing surface; 52 abutment surface; 53 bolt hole; 54 side surface; 55 second bolt hole; 56 first abutment surface; 57 first facing surface; 58 second abutment surface; 59 second facing surface; 61 first contact surface; 62 first top surface; 63, 66 protrusion proximal end portion; 64, 67 protrusion distal end portion; 65 stepped surface; 68 circumferential surface; second contact surface; 72 bottom surface; 73 opening; 74 bottom; 100, 100A laser machining device; 102 laser light oscillator; 103 optical path pipe; 104 machining head; 105 bellows; 106 movable table; 107 control device; 110 lens; 111 transmission mirror; 112 arm; 113 rotation mechanism; 114 condensing unit; 115 horizontal portion; 116 first inclined portion; 117 second inclined portion; 118 third inclined portion; 119 vertical portion; 120 first optical path hole; 121 second optical path hole; 122 straight portion; 123 curved portion; 124 third optical path hole; 125 first axis; 126 second axis; C1, C2 central axis; L1, L2 polygon; N1, N2 normal direction; W workpiece.

The invention claimed is:

1. An attaching and detaching apparatus comprising:
a first mounting plate to which a first mounting object is to be mounted;
a second mounting plate to which a second mounting object is to be mounted, the second mounting plate being disposed at a distance from the first mounting plate;
a magnet to separably connect the first mounting plate and the second mounting plate to each other; and
a connecting member disposed between the first mounting plate and the second mounting plate, the connecting member being formed separately from the first mounting plate and the second mounting plate, wherein
the connecting member includes a first connecting member fixed to the first mounting plate and a second connecting member fixed to the second mounting plate,
at least one protrusion is formed on a first one of the first connecting member and the second connecting member, the protrusion projects toward a second one of the first connecting member and the second connecting member,
at least one hole into which the protrusion fits is formed on the second one of the first connecting member and the second connecting member,
the protrusion has a first contact surface in a shape symmetric about a central axis of the protrusion,
an inner surface of the hole is a second contact surface in a shape symmetric about a central axis of the hole, and
the first contact surface and the second contact surface are in contact with each other with the central axis of the protrusion coinciding with the central axis of the hole, and wherein the attaching and detaching apparatus further comprising:
a first bolt to fix the second connecting member to the second mounting plate, wherein
a first bolt hole for accommodating the first bolt is formed in the second connecting member,
a first through hole for allowing the first bolt to pass therethrough is formed in the second mounting plate, and
the first hole is larger than a shaft diameter of the first bolt.

2. The attaching and detaching apparatus according to claim 1, further comprising:
a second bolt to fix the first connecting member to the first mounting plate, wherein
a second bolt hole for accommodating the second bolt is formed in the first connecting member,
a second through hole for allowing the second bolt to pass therethrough is formed in the first mounting plate, and
the second through hole is larger than a shaft diameter of the second bolt.

3. The attaching and detaching apparatus according to claim 1, wherein
the first mounting plate has a first connecting surface of a planar shape facing the second mounting plate,
the central axis of the protrusion or the hole formed on the first connecting member is parallel to a normal direction of the first connecting surface,
the second mounting plate has a second connecting surface of a planar shape facing the first mounting plate, and
the central axis of the protrusion or the hole formed on the second connecting member is parallel to a normal direction of the second connecting surface.

4. The attaching and detaching apparatus according to claim 1, wherein
the first mounting plate has a first connecting surface of a planar shape facing the second mounting plate,
the second mounting plate has a second connecting surface of a planar shape facing the first mounting plate,
the attaching and detaching apparatus further comprises a third bolt to fix the magnet to one of the first mounting plate and the second mounting plate,
the magnet is a plate-shaped magnet,
a third through hole is formed in the magnet, the third through hole allowing the third bolt to pass therethrough, and
a third bolt hole communicating with the third through hole for accommodating the third bolt is formed in one of the first mounting plate and the second mounting plate.

5. The attaching and detaching apparatus according to claim 4, wherein central axes of the third through hole and the third bolt hole are parallel to the first connecting surface and the second connecting surface.

6. The attaching and detaching apparatus according to claim 1, wherein
the first contact surface decreases in diameter from a base of the protrusion toward a tip of the protrusion, and
the second contact surface increases in diameter from a bottom of the hole toward an opening of the hole.

7. An attaching and detaching apparatus comprising:
a first mounting plate to which a first mounting object is to be mounted;
a second mounting plate to which a second mounting object is to be mounted, the second mounting plate being disposed at a distance from the first mounting plate;
a magnet to separably connect the first mounting plate and the second mounting plate to each other; and
a connecting member disposed between the first mounting plate and the second mounting plate, the connecting member being formed separately from the first mounting plate and the second mounting plate, wherein
the connecting member is fixed to the first mounting plate,
at least one protrusion is formed on a first one of the connecting member and the second mounting plate, the protrusion projects toward a second one of the connecting member and the second mounting plate,
at least one hole into which the protrusion fits is formed on the second one of the connecting member and the second mounting plate,
the protrusion has a first contact surface in a shape symmetric about a central axis of the protrusion,
an inner surface of the hole is a second contact surface in a shape symmetric about a central axis of the hole, and
the first contact surface and the second contact surface are in contact with each other with the central axis of the protrusion coinciding with the central axis of the hole, and wherein
the attaching and detaching apparatus further comprising:
a first bolt to fix the connecting member to the first mounting plate, wherein
a first bolt hole for accommodating the first bolt is formed in the connecting member,
a first through hole for allowing the first bolt to pass therethrough is formed in the first mounting plate, and
the first through hole is larger than a shaft diameter of the first bolt.

8. The attaching and detaching apparatus according to claim 7, further comprising a second bolt to fix the magnet to one of the first mounting plate and the second mounting plate, wherein
the magnet is a plate-shaped magnet,
a second through hole is formed in the magnet, the second through hole allowing the second bolt to pass therethrough, and
a second bolt hole communicating with the second through hole for accommodating the second bolt is formed in one of the first mounting plate and the second mounting plate.

9. The attaching and detaching apparatus according to claim 7, further comprising:
a second bolt to fix the magnet to one of the first mounting plate and the second mounting plate, wherein
the magnet includes a magnet and a plate portion,
the magnet has an attracting surface facing the other of the first mounting plate and the second mounting plate,
the plate portion has a flat surface orthogonal to the attracting surface,
a second through hole is formed in the plate portion, the second through hole having an opening defined by the flat surface and allowing the second bolt to pass through the second through hole, and
a second bolt hole is formed in one of the first mounting plate and the second mounting plate, the second bolt hole communicating with the second through hole for accommodating the second bolt.

10. The attaching and detaching apparatus according to claim 7, wherein
the first contact surface decreases in diameter from a base of the protrusion toward a tip of the protrusion, and
the second contact surface increases in diameter from a bottom of the hole toward an opening of the hole.

11. An attaching and detaching apparatus comprising:
a first mounting plate to which a first mounting object is to be mounted;
a second mounting plate to which a second mounting object is to be mounted, the second mounting plate being disposed at a distance from the first mounting plate;
a magnet to separably connect the first mounting plate and the second mounting plate to each other; and
a connecting member disposed between the first mounting plate and the second mounting plate, the connecting member being formed separately from the first mounting plate and the second mounting plate, wherein
the connecting member is fixed to the first mounting plate,
at least one protrusion is formed on a first one of the connecting member and the second mounting plate, the protrusion projects toward a second one of the connecting member and the second mounting plate,
at least one hole into which the protrusion fits is formed on the second one of the connecting member and the second mounting plate,
the protrusion has a first contact surface in a shape symmetric about a central axis of the protrusion,
an inner surface of the hole is a second contact surface in a shape symmetric about a central axis of the hole, and
the first contact surface and the second contact surface are in contact with each other with the central axis of the protrusion coinciding with the central axis of the hole, and wherein
the attaching and detaching apparatus further comprises a first bolt to fix the magnet to one of the first mounting plate and the second mounting plate, the magnet is a plate-shaped magnet, a first through hole is formed in the magnet, the first through hole allowing the first bolt to pass therethrough, and a first bolt hole communicating with the first through hole for accommodating the first bolt is formed in one of the first mounting plate and the second mounting plate.

12. The attaching and detaching apparatus according to claim 11, wherein the first mounting plate has a first connecting surface of a planar shape facing the second mounting plate, the second mounting plate has a second connecting surface of a planar shape facing the first mounting plate, central axes of the first through hole and the first bolt hole are parallel to the first connecting surface and the second connecting surface.

13. The attaching and detaching apparatus according to claim 11, further comprising:

a second bolt to fix the connecting member to the first mounting plate, wherein a second bolt hole for accommodating the second bolt is formed in the connecting member, a second through hole for allowing the second bolt to pass therethrough is formed in the first mounting plate, and the second through hole is larger than a shaft diameter of the second bolt.

14. The attaching and detaching apparatus according to claim 11, wherein the first contact surface decreases in diameter from a base of the protrusion toward a tip of the protrusion, and the second contact surface increases in diameter from a bottom of the hole toward an opening of the hole.

15. A machining device comprising:

the attaching and detaching apparatus according to claim 1; and a machining head mounted to the first mounting plate or the second mounting plate to perform machining or welding on a workpiece.

16. A machining device comprising:

the attaching and detaching apparatus according to claim 7; and a machining head mounted to the first mounting plate or the second mounting plate to perform machining or welding on a workpiece.

17. A machining device comprising:

the attaching and detaching apparatus according to claim 11; and a machining head mounted to the first mounting plate or the second mounting plate to perform machining or welding on a workpiece.

18. A machining head comprising:

an arm;

a rotation mechanism to rotate the arm; and a condensing unit connected to a distal end of the arm to condense laser light, wherein the arm includes two inclined portions inclined relative to a vertical axis, the attaching and detaching apparatus according to claim 1 is capable of being disposed between the two inclined portions, and an optical path hole for allowing the laser light to pass therethrough is formed inside the arm.

19. A machining head comprising:

an arm;

a rotation mechanism to rotate the arm; and a condensing unit connected to a distal end of the arm to condense laser light, wherein the arm includes two inclined portions inclined relative to a vertical axis, the attaching and detaching apparatus according to claim 8 is capable of being disposed between the two inclined portions, and an optical path hole for allowing the laser light to pass therethrough is formed inside the arm.

20. A machining head comprising:

an arm;

a rotation mechanism to rotate the arm; and a condensing unit connected to a distal end of the arm to condense laser light, wherein the arm includes two inclined portions inclined relative to a vertical axis, the attaching and detaching apparatus according to claim 13 is capable of being disposed between the two inclined portions, and an optical path hole for allowing the laser light to pass therethrough is formed inside the arm.

* * * * *